MOTORIZED RESET MECHANISM FOR REGISTERS

Filed March 12, 1963 11 Sheets-Sheet 1

INVENTORS
GEORGE W. WRIGHT,
ELMER A. ROBBINS,
MELVIN C. HANKEL &
BURDETTE W. FOSS
BY: Edmund W. E. Kamm
ATTORNEY

MOTORIZED RESET MECHANISM FOR REGISTERS

Filed March 12, 1963

INVENTORS
GEORGE W. WRIGHT,
ELMER A. ROBBINS,
MELVIN C. HANKEL &
BURDETTE W. FOSS
BY: Edmund W. C. Kamm
ATTORNEY

MOTORIZED RESET MECHANISM FOR REGISTERS

Filed March 12, 1963 11 Sheets-Sheet 3

INVENTORS
GEORGE W. WRIGHT,
ELMER A. ROBBINS,
MELVIN C. HANKEL &
BURDETTE W. FOSS
BY: Edmund W. E. Kamm
ATTORNEY INVENTORS
GEORGE W. WRIGHT,
ELMER A. ROBBINS,
MELVIN C. HANKEL &
BURDETTE W. FOSS BY: Edmund W. E. Kamm
ATTORNEY

MOTORIZED RESET MECHANISM FOR REGISTERS

Filed March 12, 1963 11 Sheets-Sheet 5

INVENTORS
GEORGE W. WRIGHT,
ELMER A. ROBBINS,
MELVIN C. HANKEL &
BURDETTE W. FOSS
BY Edmund W. E. Kamm
ATTORNEY INVENTORS
GEORGE W. WRIGHT,
ELMER A. ROBBINS,
MELVIN C. HANKEL &
BURDETTE W. FOSS
BY: Edmund W. E. Kamm
ATTORNEY INVENTORS
GEORGE W. WRIGHT,
ELMER A. ROBBINS,
MELVIN C. HANKEL &
BURDETTE W. FOSS
BY: Edmund W. E. Kamm
ATTORNEY

MOTORIZED RESET MECHANISM FOR REGISTERS

Filed March 12, 1963

(HANDLE & CONTROL SHAFT EVENTS)

(POWER SHAFT EVENTS)

INVENTORS
GEORGE W. WRIGHT,
ELMER A. ROBBINS,
MELVIN C. HANKEL &
BURDETTE W. FOSS

BY: Edmund W. E. Kamm
ATTORNEY

June 8, 1965 G. W. WRIGHT ETAL 3,187,945

MOTORIZED RESET MECHANISM FOR REGISTERS

Filed March 12, 1963

11 Sheets-Sheet 9

INVENTORS
GEORGE W. WRIGHT,
ELMER A. ROBBINS,
MELVIN C. HANKEL &
BURDETTE W. FOSS

BY: Edmund W. E. Kamm
ATTORNEY

INVENTORS
GEORGE W. WRIGHT,
ELMER A. ROBBINS,
MELVIN C. HANKEL &
BURDETTE W. FOSS

BY: Edmund W. E. Kamm
ATTORNEY

MOTORIZED RESET MECHANISM FOR REGISTERS

Filed March 12, 1963

INVENTORS
GEORGE W. WRIGHT,
ELMER A. ROBBINS,
MELVIN C. HANKEL &
BURDETTE W. FOSS
BY: Edmund W.E. Kamm
ATTORNEY United States Patent Office 3,187,945
Patented June 8, 1965

3,187,945
MOTORIZED RESET MECHANISM FOR REGISTERS

George W. Wright, Yoder, and Elmer A. Robbins, Melvin C. Hankel, and Burdette W. Foss, Fort Wayne, Ind., assignors to Tokheim Corporation, Fort Wayne, Ind., a corporation of Indiana Filed Mar. 12, 1963, Ser. No. 264,511
24 Claims. (Cl. 222—35)

This application is a continuation-in-part of our application serial No. 213,499, filed July 30, 1962, for Power Reset Mechanism for Registers.

This invention relates to motorized reset mechanisms for registers. More specifically, it relates to power means for resetting to zero the registers of a motor fuel dispenser and for thereafter conditioning the dispenser to deliver liquid.

An object of the invention is to provide improved means for resetting the registers to zero in response to the movement of manual control means to one position from an initial position, for conditioning the dispenser to deliver liquid after the resetting function is completed and for preventing delivery of liquid from the dispenser when the manual control means are returned toward the initial position.

Another object of the invention is to provide a mechanism of the kind described in which the resetting and conditioning functions are performed by an electric motor which is energized only once during a complete cycle of the dispensing apparatus.

A further object of the invention is to provide a structure of the kind described which is capable of use, with minor modifications, for an integrated motor pump dispenser, in which the motor pump, meter, registers, dispensing hose and manual controls are included in one housing; for a dispensing pedestal in which the motor pump is remotely disposed with respect to the housing containing the hose, meter, manual controls and registers and for a remote registration system in which the meter and registers are provided in a housing and are disposed remotely from the housing containing the dispensing hose and the manual controls.

These and other objects will become apparent from the study of this specification and the drawings which are attached hereto, made a part hereof and in which.

*Dispenser structure*

Figures 1, 4:
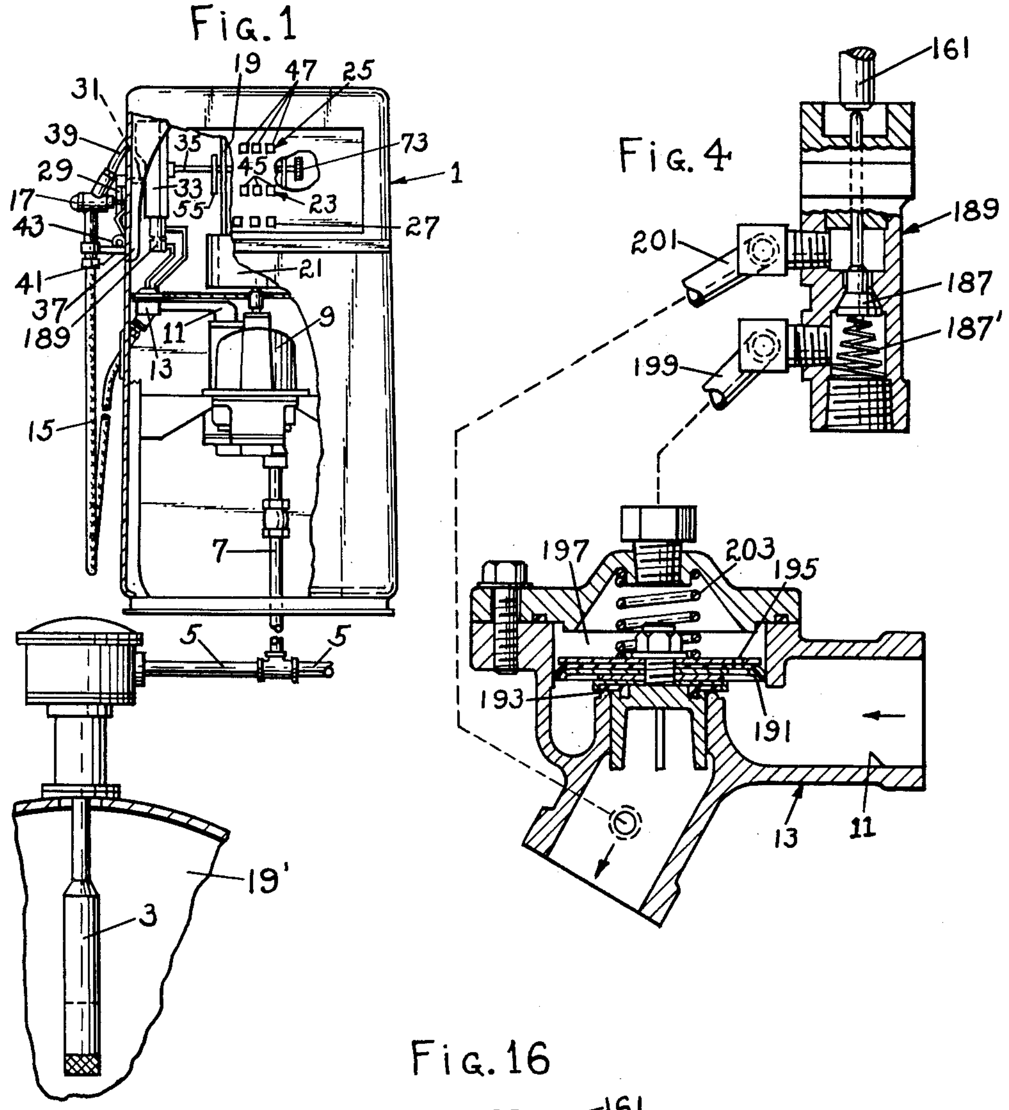
FIGURE 1 is an elevation, partly in section, showing a dispensing pedestal supplied by a remotely disposed motor pump unit.
FIGURE 4 is a sectional view of a pilot valve and a control valve, which constitutes one form of control device which is used in a dispensing pedestal such as that shown in FIGURE 1.
Figure 16:
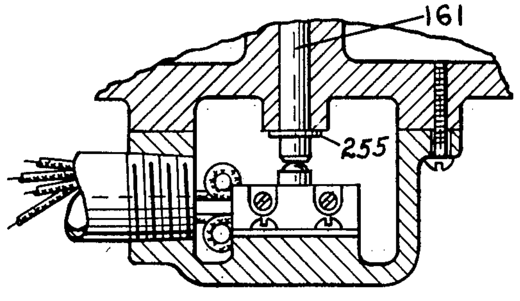
FIGURE 16 is a switch for operating the valve means of the structure of FIGURE 14.

Referring first to FIGURE 1, the numeral 1 represents a dispensing pedestal which is supplied with fuel under pressure from a remotely located motor driven pump 3 through a delivery manifold 5 and a branch pipe 7 which is connected to the inlet of a meter 9. The discharge conduit 11 of the meter is connected with a control valve 13, to the outlet of which a hose 15 is connected. The hose terminates in a valved nozzle 17 which may be of any type which are in common use.

The motor pump unit 3 is shown as being submerged in the storage tank 19' although of course motor pumps which are located above ground or in pits and which are connected with the tank by a suction pipe are well known in the art and may be used instead of that shown.

In systems of the type described, in which the manifold 5 is connected to supply two or more pedestals, the pump is connected to be started by any pedestal and may be running because one pedestal is in use. A control valve such as 13 or of some other type must be provided for each pedestal so that no fuel can be dispensed from a pedestal until the registers thereof have been reset to zero.

It is obvious, of course, that if the motor pump is started by and is connected to supply only one dispenser, as in the case of a suction type motor pump dispenser, no control valve is needed unless the motor pump is started, for any reason, before resetting of the registers is completed.

*Computing and registering structure*

Referring again to FIGURE 1, a registering mechanism indicated generally by 19 is connected to be driven by the meter 9. Usually this mechanism comprises a variator 21 which has one output shaft for driving a pair of resettable quantity registers 23, one on each side of the dispenser, and another output shaft to drive a pair of cost registers 25. The unit price registers 27 display the unit price at which the variator is set to compute the cost of the delivered fuel.

The basic structure of the registers is disclosed in U.S. Patent 2,814,444 and in our prior application Serial No. 213,499 of which this application is a continuation-in-part and a more complete description thereof at this point is believed to be unnecessary.

A manually operable control lever or handle 29 (FIGS. 2–3) is fixed to a control shaft 31 which is pivotally mounted in an explosion proof box 33. The box is mounted on the frame of the dispenser and flexible shafting comprising a coupling shaft 35 connected, by universal joints at each end, is utilized to transmit motion from the mechanism housed in the box to the registering mechanism, as shown in detail in our prior application.

Figure 3:
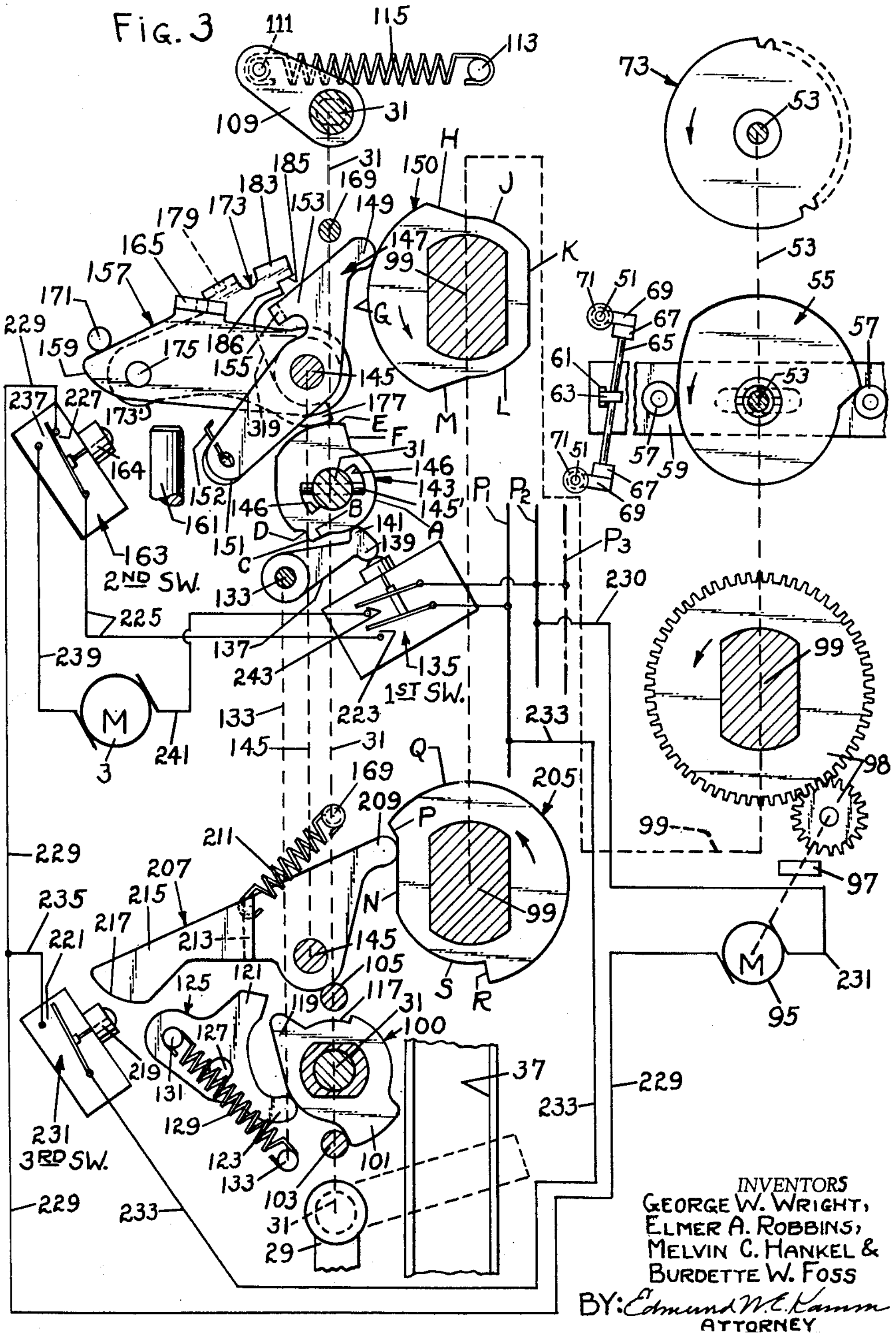
FIGURE 3 is an exploded view showing the manual control and power shafts together with the mechanisms and devices which are operated by said shafts as well as the wiring diagram.

When the dispenser is in its normal, non-dispensing condition, handle 29 is disposed beside and generally parallel with the opening in the boot 37 which receives part of the nozzle spout 39 and valve trigger guard 41 when the nozzle is mounted on its support 43. When the nozzle has been removed from its support, the lever may be turned counterclockwise so as to overlie the entrance to the boot (FIG. 3). Such rotation starts a cycle of events which proceed automatically to a conclusion and results in the resetting of all of the registers to zero and in the conditioning of the dispenser to deliver fuel whenever the nozzle valve is opened. The quantity and cost of the fuel is accumulated on the registers 23 and 25 as the delivery proceeds.

Upon completion of the delivery, the lever 29 must be rotated clockwise, substantially to its initial position before it clears the boot so that the nozzle can be remounted on its support, and during such rotation the dispenser is conditioned so that no more fuel can be delivered from it without again resetting the registers.

With this description of the general cycle of operation of the dispenser in mind, reference is made to FIGURES 3 and 6 to 8. As described in our prior application and in said Patent 2,814,444, the registers 23 and 25 comprise a plurality of individual indicator wheels or dials 45, 47 each of which comprises a clutch mechanism which is shiftable, upon endwise motion of shafts 51 (FIG. 3), to one position to clutch the dials to the gear trains driven by the output shafts of the variator, so as to accumulate the quantity of fuel dispensed and the cost thereof. When the clutch mechanisms are shifted to another position by reverse motion of shafts 51, the dials are connected to be driven by the resetting shafts 91 (FIG. 6) and gears 49′ (FIG. 7) until the dials reach their zero indicating positions. The dials of each register are rotatably mounted on the shafts 51 of the respective registers which shift the clutch mechanisms.

As shown in FIGURE 3, the registering mechanism is provided with a main shaft 53 which is mounted for rotation in the register frame. A cam 55 is fixed to the shaft and is adapted to engage follower rolls 57 which are mounted on a slide 59. The slide is supported for reciprocation on the register frame and has an opening 61 at each end, each of which receives the end of a lever 63 mounted on a shaft 65 which is mounted in bearings 67 on the register frame. Gear sectors 69 are mounted on both ends of each of the shaft and mesh with the teeth 71 of a circular rack on the end of the corresponding clutch shifting shaft 51 of each of the four registers.

Thus as the cam 55 is rotated counterclockwise from its initial position as shown by the arrow in FIGURE 3, it will first move the slide to the left to a predetermined position and hold it in such position. The slide, during its motion rotates levers 63, shafts 65, and sectors 69 a predetermined distance and moves the clutch shafts 51 which in turn shift the clutch of the numeral dials so that the dials will be declutched from the variator and will be clutched to the reset gears 49, 49′.

The other end of shaft 53 has fixed to it a sector gear 73 shown in detail in FIGURES 6 to 9. The twelve teeth 74 of this gear are adapted to mesh with all of the teeth of a pinion 75 which has two diametrically opposed groups of three full length teeth 77 interspaced by a pair of diametrically opposed short teeth 79.

Figures 6, 7, 8, 9, 10:
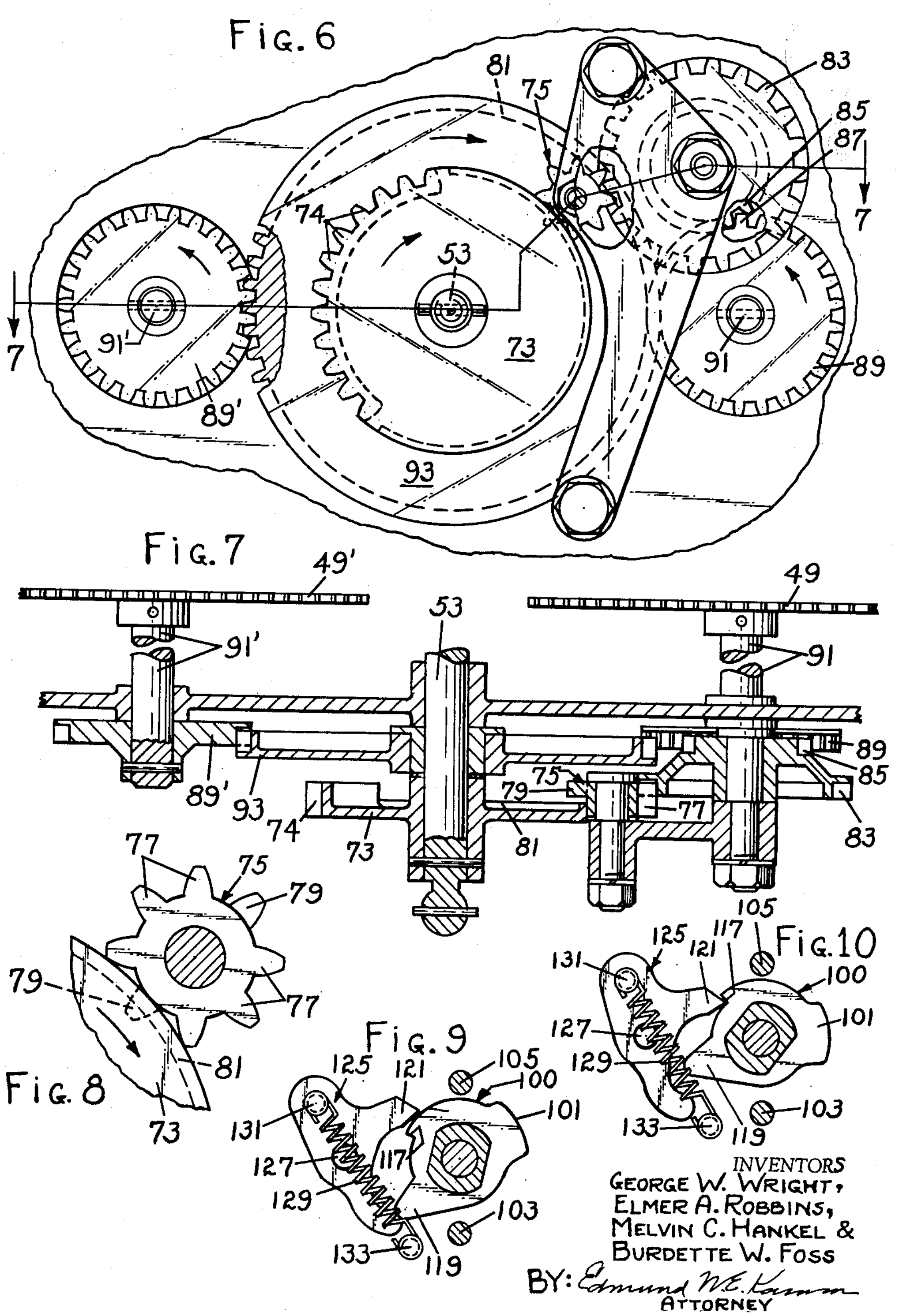
FIGURE 6 is an end elevation of the gearing which connects the power shaft to actuate the register resetting shafts.
FIGURE 7 is a section taken substantially on the line 7—7 of FIGURE 6.
FIGURE 8 is an elevation showing the locking means for the register resetting shafts.
FIGURE 9 is an elevation showing the interlock pawl in the position which it occupies when it is conditioned for subsequent interlocking engagement with its stop tooth.
FIGURE 10 shows the interlock pawl in interlocking engagement with its stop tooth.

Gear 73 has an axially extending locking flange 81 extending from a point adjacent one end tooth 74 of the sector, peripherally away from said tooth and terminating at a corresponding point adjacent the other end tooth. The flange is located so as to be tangent to the hub at 75 in the gap left by the short teeth as shown in FIGURE 8, so that the long teeth 77 of the pinion, on opposite sides of one of the short teeth, ride on the locking flange to prevent rotation of the pinion during the portion of the rotation of gear 73 which is required to move the flange past the leading tooth 77 of the pinion. The short tooth 79 which projects past the axial side of the flange (FIG. 7) is thus positioned to be driven by the advancing end tooth 74 of the sector gear 73 and by the time these teeth engage, the flange will have moved clear of the leading long tooth 77 of the pinion so that the latter is unlocked and is free to rotate. Since the sector gear has 12 teeth and the pinion has 8, it is obvious that the pinion will be rotated 1.5 revolutions upon each passage of teeth 74 and the other pair of long pinion teeth will engage the locking flange as the last tooth 74 of the sector gear leaves the trailing long tooth of this pair. The other short tooth 79 will thus be held in position for engagement by the sector gear on the next cycle.

All of the pinion teeth act to drive a gear train comprising gears 83, 85 and 89. Gear 89 drives shaft 91 and the resetting gears 49 for the quantity and cost registers on one side of the registering mechanism. The rotation of gear 89 is transmitted through gear 93 which rotates on shaft 53, gear 89′ and shaft 91′ to the reset gears 49′ for the other bank of registers.

The initial or starting position of the sector gear 73 and the cam 55 are shown in FIGURES 3 and 6, and their angular relationship is such that the cam 55 shifts the clutches as described above while the pinion 75 is locked, next the pinion is unlocked and the resetting gears 49, 49′ are driven so as to reset the registers, the pinion is relocked and the cam shifts the shafts 51 and the clutches to their initial positions to reclutch the dials to the variator output trains.

Figure 2:
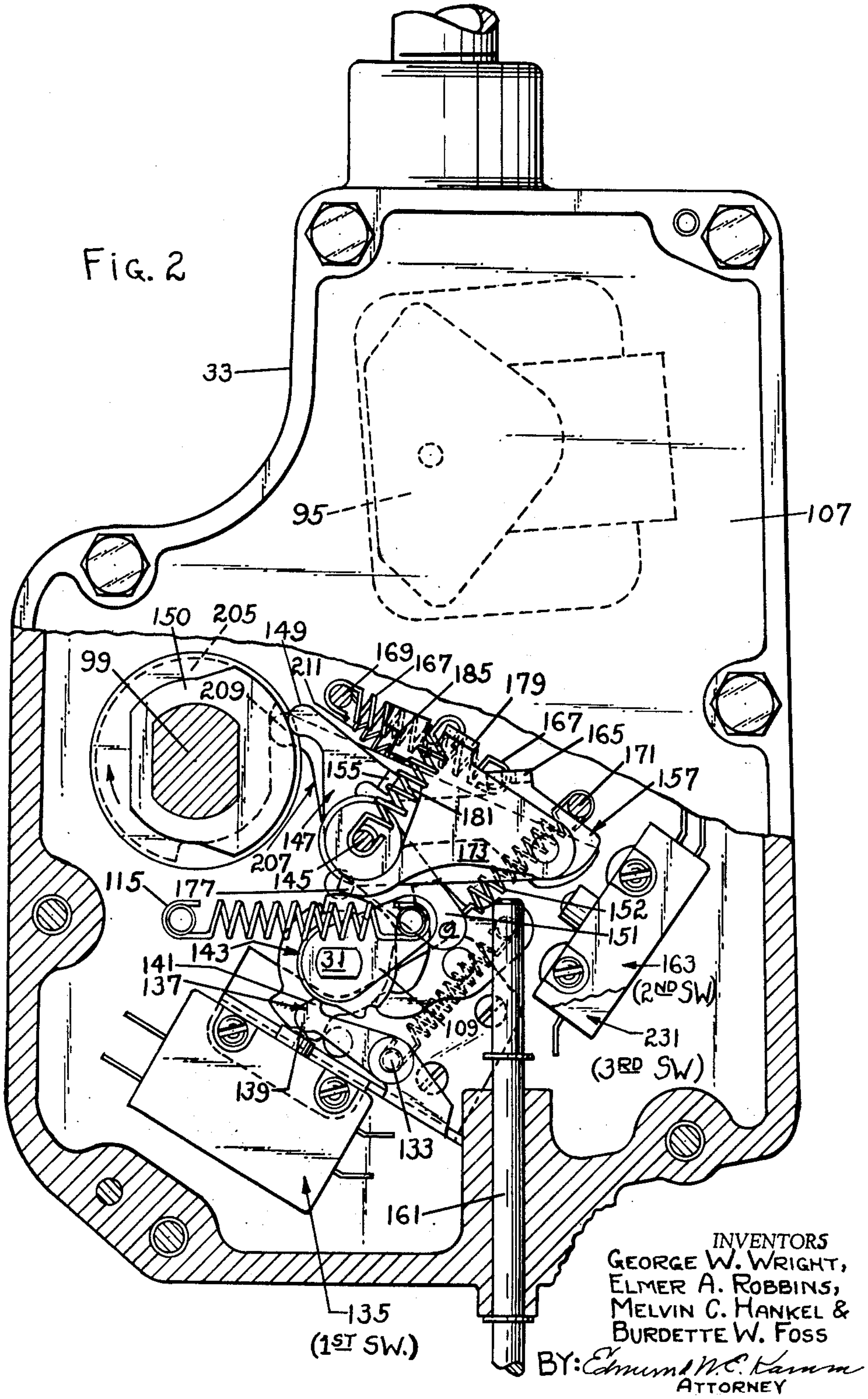
FIGURE 2 is an elevation, partly in section, showing the explosion-proof box which houses the resetting motor and the various operating mechanisms, together with certain of the control devices.

As shown in FIGURES 2 and 3 an electric reset motor 95 is housed in the explosion proof box and is connected by reduction gearing represented by 97, 98 and shown in detail in our prior application, to drive a power shaft 99 in the direction indicated by the arrows. The value of the reduction gearing is about 195.5 to 1 and the motor 95 is preferably of a type having a brake which is inoperative while the motor is energized but which becomes operative to brake the motor to a stop upon reenergization of the motor.

*Actuator shaft stops*

Referring now to FIGURES 2 and 3, it will be seen that the control handle 29 can be rotated counterclockwise from its vertical, full line position (FIG. 3), to the dashed line position to start the dispensing cycle. An element 100 is fixed to shaft 31 and carries a stop lug 101, the ends of which strike pins 103, 105, set in the cover 107 for the box, to limit the rotation of 29 and 31 to about 107°.

*Stroke completing device*

The opposite end of the actuator shaft 31 carries a lever 109 having a pin 111 extending parallel with shaft 31 and with a pin 113 fixed in the box. A helical tension spring 115 is hooked between the pins. The lever is so positioned relative to shaft 31 and pin 113 that the centerline of the spring passes that of shaft 31 when the lever has been rotated about 49° counterclockwise from its initial position, so that the spring will complete the rotation of the shaft after it has been manually rotated slightly farther and released. This rotation is stopped when lug 101 strikes pin 105.

*Interlock*

An interlock tooth 117 and a cam 119 are formed as a part of element 100 and are adapted to coact with the stop arm 121 and cam follower arm 123 respectively of an interlock pawl 125, which is pivoted on a pin 127 fixed in the box. A helical tension spring 129 is connected at opposite ends to a pin 131 on the pawl and a pin 133 on the box, said pins and spring being so arranged relative to the pivot pin 127 so that when the spring centerline passes across that of pin 127 it will complete the clockwise or counterclockwise rotation of the pawl.

The pawl 125 is shown in its normal position in FIGURE 3. As the shaft 31 and element 100 are rotated counterclockwise, cam 119 acts on follower 123 to rotate the pawl clockwise. The spring passes pin 127 and becomes effective to rotate the pawl clockwise when the handle and shaft 31 have rotated counterclockwise to a point 70°–73.5°, say 72°, from their initial positions. The tooth 117, however, occupies the position shown in FIGURE 9 at such time so that the stop arm 121 will rest on the edge of element 100 but will not engage the tooth. It is, however, conditioned for movement to an effective position relative to the tooth, as shown in FIGURE 10, upon subsequent clockwise rotation of the handle and shaft 31 to the 62.5° position as will be more fully described below.

*Operator for 1st switch*

The switch 135 will hereafter be referred to generally as the "1st switch." It is preferably a "snap action" switch by which is meant that the sets of contacts are either in open or closed position and they move to these positions quickly.

A cam follower arm 137 is pivotally mounted on pin 133 described above, and the end of the arm is provided with transversely extending projections 139, 141 which ride on the actuating button of the switch 135 and on the cam 143 respectively. The cam is mounted on and for limited rotary movement with respect to the actuator shaft 31. A pin 145' extends transversely through this shaft and its ends extend into "dove tail" slots 146 in the inner portion of the cam. The peripheral length of these slots and the diameter of the pin are such as to permit a relative lost motion rotation of the cam and shaft of 37°.

Figure 3A:
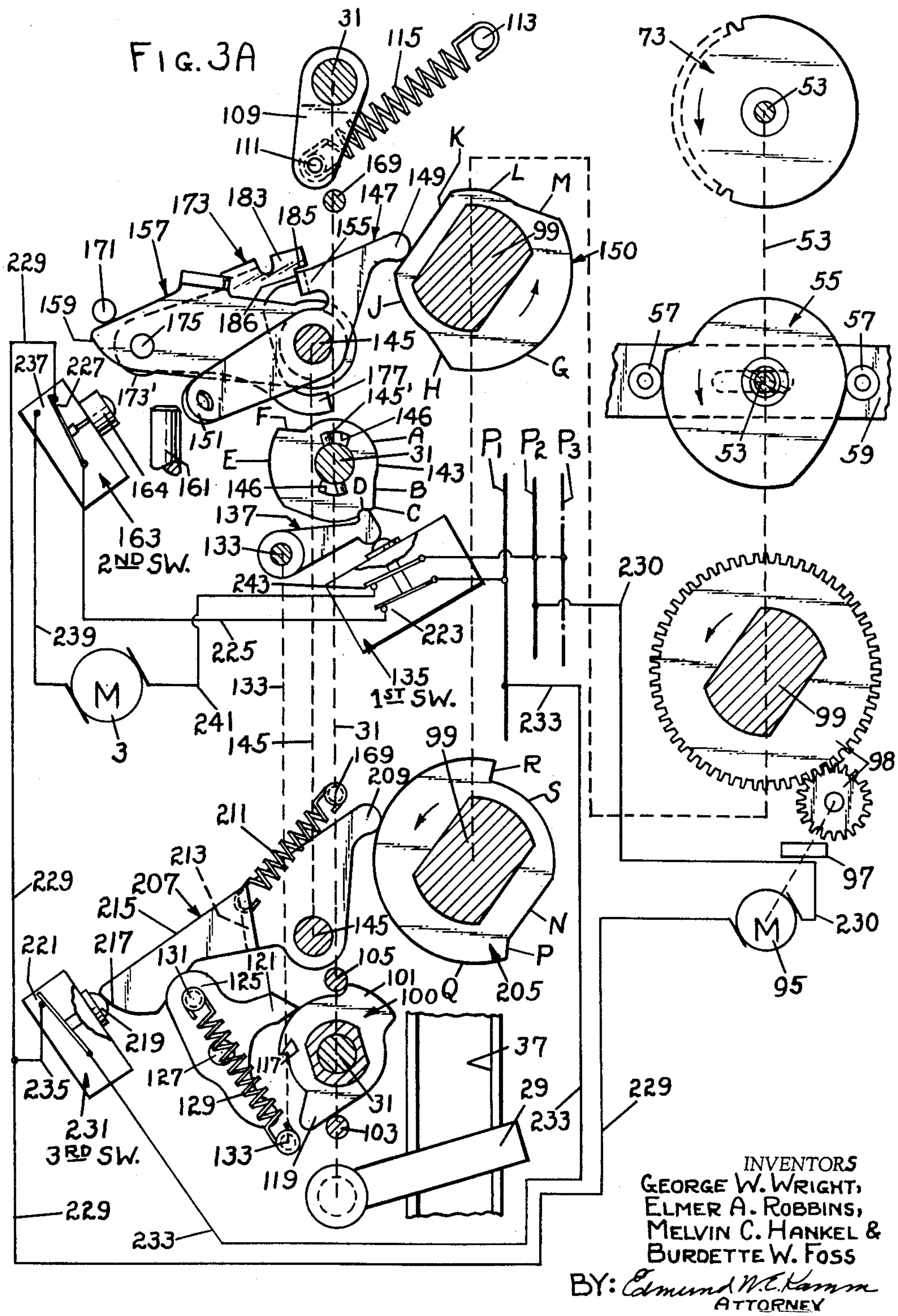
FIGURE 3A is a view similar to FIGURE 3 showing the parts in a first intermediate position.
Figure 3B:
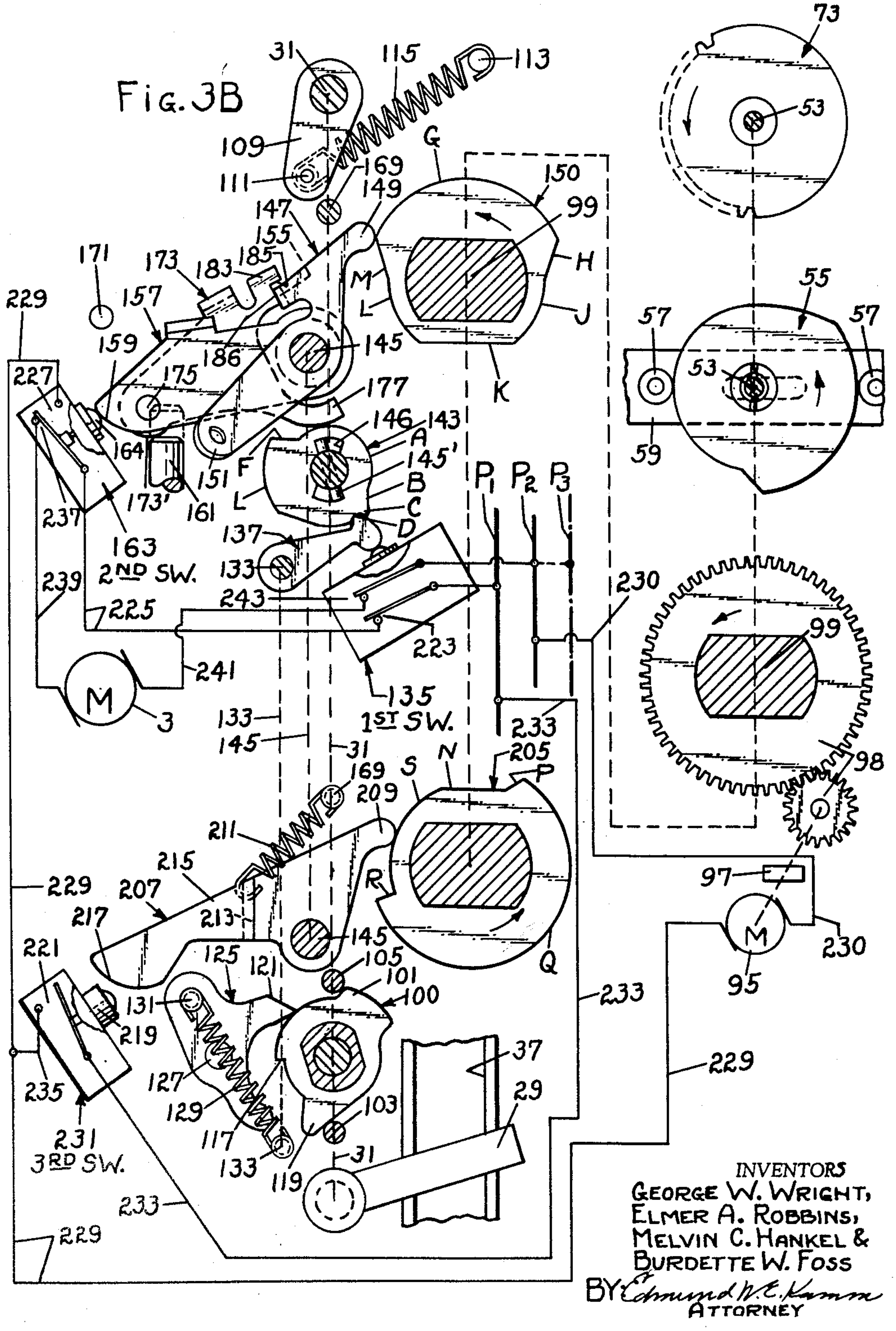
FIGURE 3B is a view similar to FIGURE 3 showing the parts in a second intermediate position.

The cam has a lower rest portion A, a rise portion B, a peak C and a notch D in which the projection 141 rests while the switch is held in its closed condition (FIGS. 3A and 3B).

As the shaft 31 and the handle rotate from their initial positions, the first 37 degrees of motion will not rotate cam 143. An additional rotation, in the same direction, of from 43.5° to 46°, say 45°, to the 82° of the shaft 31 is required to close the contacts of switch 135 and hold them closed during the remainder of the rotation of the shaft 31 in the same direction.

Closure of these contacts will start the resetting motor 95 as will be explained below. The operation of the motor will perform the declutching, resetting and reclutching functions of the registering mechanism as explained above and will thereafter operate the control devices to condition the dispenser for operation to deliver fuel.

*Control apparatus actuating device and operation*

Cam 143 has lobe or portion E which is connected by a descent portion F with the rest portion A.

A stud 145 is fixed to the cover 107 so as to extend parallel to shafts 31 and 99. A lever 147, having a cam follower arm 149 and a perforated bent out arm 151 extending in generally opposite directions, is pivotally mounted on stud 145. A spring 152 (FIG. 2) is hooked at one end in the perforation and at the other end to a pin 171 fixed in the cover and urges the follower 149 toward its cam 150.

The follower arm has a backwardly extending portion 153 which has a rearwardly bent end to form latch element 155.

A lever 157 is also pivoted at one end on the stud 145 and has a curve end or nose portion 159 for actuating both the plunger 161 and the actuating button 164 of a switch 163 hereafter referred to as the "2nd switch." This is also preferably a "snap switch." A forwardly bent, perforated ear 165 is disposed about midway of the length of lever 157 at the upper edge thereof (FIG. 2). A helical tension spring 167 is hooked in the perforation and on a pin 169 fixed to the cover so as to urge the lever 157 in a clockwise direction (FIG. 3) and in the opposite direction (FIG. 2) against a fixed stop pin 171.

A bifurcated interponent lever 173, shown mostly in dashed lines in FIGURE 3 and full in FIGURE 2, is pivoted on a pin 175 fixed in the nose end of lever 157. The cam follower arm 177 of this lever extends underneath stud 145 and its lower edge rests upon lobe E of the cam 143 in the initial position of the parts. The upper edge of the lever has a perforated tab 179 bent rearwardly and one end of a helical tension spring 181 is hooked thereon while the other end of the spring is hooked on stud 145, as shown in FIGURE 2. The spring urges the interponent clockwise (FIG. 3) about its pivot 175 and urges the follower arm 177 against lobe E of the cam 143.

The other arm 183 of lever 173 extends generally parallel to arm 177 and has a 90 degree notch 185 at its lower right hand corner which is adapted to receive the latch element or ear 155 of lever 147. The upright portion 186 of the lever 173 which defines a part of the notch serves as a thrust abutment against which the ear 155 is adapted to abut.

In the initial position of the parts described above, the follower 149 will be held in engagement with cam 150 on power shaft 99 by spring 152; lever 157 will be held in engagement with stop pin 171 by spring 167 and follower arm 177 of the bifurcated interponent lever 173 will be held in contact with lobe E of cam 143 by spring 181 as shown in FIG. 3.

As handle 29 and control shaft 31 are rotated counterclockwise toward the "on" position, cam 143 is picked up by pin 145 and rotated, the lobe E is withdrawn from underneath the follower 177 of lever 179, which rides down the drop F until the lower edge of the upper arm 183 rests on the ear of latch 155. Lever 173 continues to be urged downwardly by its spring. This action of 173 preferably occurs before the 1st switch is operated to its closed position.

As explained above, as soon as motor 95 starts, cam 150 rotates counterclockwise and follower 149 will ride off the high portion G, down the fall portion H, onto the rest portion J and down the additional fall portion K. When the cam and follower reach the relative positions shown in FIGURE 3A, the lever 147 will have rotated clockwise far enuogh to move the ear or latch 155 along the bottom edge of the arm 173 until it reaches the notch, whereupon the spring 181 will rotate lever 173 clockwise to position the abutment 186 for engagement with and for operation by the ear 155 as the cam 150 continues its rotation.

It will be seen from FIGURE 3A that when the abutment 186 has dropped behind ear 155, the clutch shifting cam 55 on the register has about completed its holding of the slide bar 57 in the displaced position. Further rotation of cam 150 will cause a further clockwise rotation of lever 147 and then a counterclockwise rotation thereof, as the remainder of the portion K of the cam passes the follower 149. This rotation is now transmited to the lever 157 by way of the interponent lever 153 but it is not sufficient to perform any function. The levers are held against rotation while the rest portion L of the cam passes follower 149 and prior to the end of such passage, cam 55 has shifted the slide 57 to its initial position restoring the clutch means of the registers to the positions in which the registers are connected to the variator output trains.

As seen in FIGURE 3B, as the rise portion M of the cam 150 passes follower 149, the hub end 173' of interponent lever 173 engages and depresses the plunger 161 from the dashed line position to the full line position thereof, and the nose end 159 of lever 157 engages and depresses the actuating button 164 of the 2nd switch 163, to reverse the contacts thereof.

The shafts 99 and 53 continue to rotate until they reach substantially the initial position shown in FIGURE 3.

In the form of the dispenser shown in FIGURE 1, the plunger 161, when it is depressed as described above, depresses and opens the poppet 187 of a pilot valve, FIGURE 4, to connect the top of the piston 191 of the control valve 13 in communication with the hose. The main valve 193 is attached to the piston. The piston defines an orifice 195 which permits a limited flow of liquid from the manifold 11, through the orifice, chamber 197, tube 199, pilot valve 189 (when the poppet 187 is open), tube 201, hose 15 and nozzle valve 17.

When the valves 178 and 17 are open, liquid is drained from chamber 197 above the piston more rapidly than it can be supplied through orifice 195 and the pressure in the chamber becomes substantially less than that in 11. This difference in pressure raises the piston 191 and opens valve 193 against the action of spring 203, so that liquid will flow directly from 11 to the hose 15.

Whenever the pilot or nozzle valve is closed, the liquid flowing through the orifice will balance the pressures on opposite sides of the piston so that the valve 193 will close and stay closed. The valve 193 also has a modulating action in that it assumes positions intermediate full closed and full open in response to different settings of the nozzle valve 17. This action is fully discussed in the patents to Jackson et al. 2,732,100 and Wright et al. 2,732,103, issued January 24, 1956.

One of the major benefits flowing from the use of the pilot and control valve in combination with the power resetting mechanism described above, is that very little power and movement is required to fully actuate the pilot valve and for this reason the motor 95, the reducing gearing 97, 98, the cams and levers 147, 157, 173, etc., can be made small and of lighter construction than if a relatively large valve such as 193 were opened directly by the plunger 161, against the full pressure of motor pump 3. The forces to which the various parts are subjected are minimized, and therefore wearing of the moving parts is reduced.

*Holding switch mechanism*

A cam 205 (FIGS. 3, 3A and 3B) is also driven counterclockwise by shaft 99. A lever 207 is pivotally mounted on stud 145 and has a follower arm 209 held in engagement with cam 205 by a helical tension spring 211 which has one end hooked in a perforation formed in an offset 213 in the other arm 215 of the lever and has its other end hooked on a fixed pin 169. The nose portion 217 of arm 215 is disposed to depress the actuating button 219 of the 3rd switch 231, which is also preferably a "snap switch" to close its normally open contacts 221.

As shown in FIGURE 3, the follower 209, in the initial position of the cam, rests on the flat N, immediately adjacent a rise portion P which terminates in a long rest portion Q. The later terminates in an abrupt drop R which intersects a section rest portion S and the rest portion intersects the flat N. Thus, within 11.5 to 15.5 degrees, say 13.5° of rotation of shaft 99 from its initial position, the lever 207 is tilted counterclockwise to close the 3rd switch and the switch is held closed until the drop R passes the follower. When this occurs, at about the 244° position of shaft 99, the switch 221 opens.

*Wiring diagram*

The electrical system shown in FIGURES 3, 3A and 3B is for a 115 volt supply in full lines and for a 230 volt supply in dashed lines. Power mains P1 and P2 are the "hot" lines and P3 is the neutral. Thus 230 volts are applied to any circuit connected across P1 and P2 whereas 115 volts are supplied to any circuit connected from P1 or P2 to P3. Three basic circuits are employed:

Circuit A which extends from P1 through the normally open contacts 223 of the 1st switch 135, wire 225, the normally closed contacts 227 of 2nd switch 163, through wire 229, resetting motor 95, line 230 to P2 for a 230 volt circuit or to P3 for a 115 volt circuit. This circuit thus supplies power to the resetting motor as soon as switch 135 is closed by the counterclockwise rotation of the handle 29, as described above.

Circuit B which extends from P1 through wire 233, normally open 3rd switch contacts 221, wires 235, 229, motor 95, wire 230 to P2 or P3. This is a holding circuit for maintaining the motor 95 energized until the resetting is completed in case lever 29 is returned to its initial position before resetting is completed via Circuit A.

Circuit C which extends from P1 through contacts 223 of 1st switch 135, wire 225, contacts 237 of 2nd switch 163, wire 239, pump motor 3, wire 241, contacts 243 of the 1st switch to the line P3 if the motor 3 is a 115 volt motor or to P2 if it is a 230 volt motor.

*Operation*

Assuming that the dispenser is in its normal, inoperative condition, the first acts necessary to start a cycle are those of removing the nozzle from the boot and rotating handle 29 and control shaft 31 from their positions shown in FIGURE 3 to the positions shown in FIGURE 3A. The events which occur and the points of their occurrence during the 107° rotation of shafts are represented by the upper horizontal line in FIGURE 11 in which the 0° point represents the full line position of the handle in FIGURE 3 and the 107° represents its FIGURE 3A position.

The first 37° of counterclockwise rotation engages the ends of the pin 145' with the ends of the dove tail slots 146 in cam 143 so that the cam will rotate with the control shaft upon continued rotation thereof.

When the control shaft 31 has rotated about 49°, spring 115 reaches the line of centers 111, 31, 115 and, depending upon the amount of force required to rotate shafts 31, the spring 115 will move the shaft 31 automatically through the remainder of its stroke in the counterclockwise direction after a slight additional rotation.

At about 72° of travel of the control shaft, the cam 119 and follower 123 have thrown spring 129 over the center line of 127, 133 and the spring has rotated the interlock pawl 121 clockwise (FIG. 9) so that it rests on element 100. However, the tooth 117 has already passed the point at which it would be blocked by the pawl 121 and consequently the pawl does not prevent further counterclockwise rotation of the control shaft. At about 80°, the lobe clears arm 177 of interponent lever 173.

Both sets of contacts 223, 243 of the 1st switch 135 close at about the 82° position of the control shaft. Circuit A is closed and the resetting motor starts so as to rotate the power shaft 99 and the main register shaft 53 through their respective cycles which are depicted in FIGURE 12.

The control shaft continues its stroke to approximately the 107° position, which is determined by the contact of lug 101 with stop 105.

The lobe E of switch cam 143 is now entirely clear of arm 177 as seen in FIGURES 3A and 3B, so that the lever 173 can function.

Figure 12:
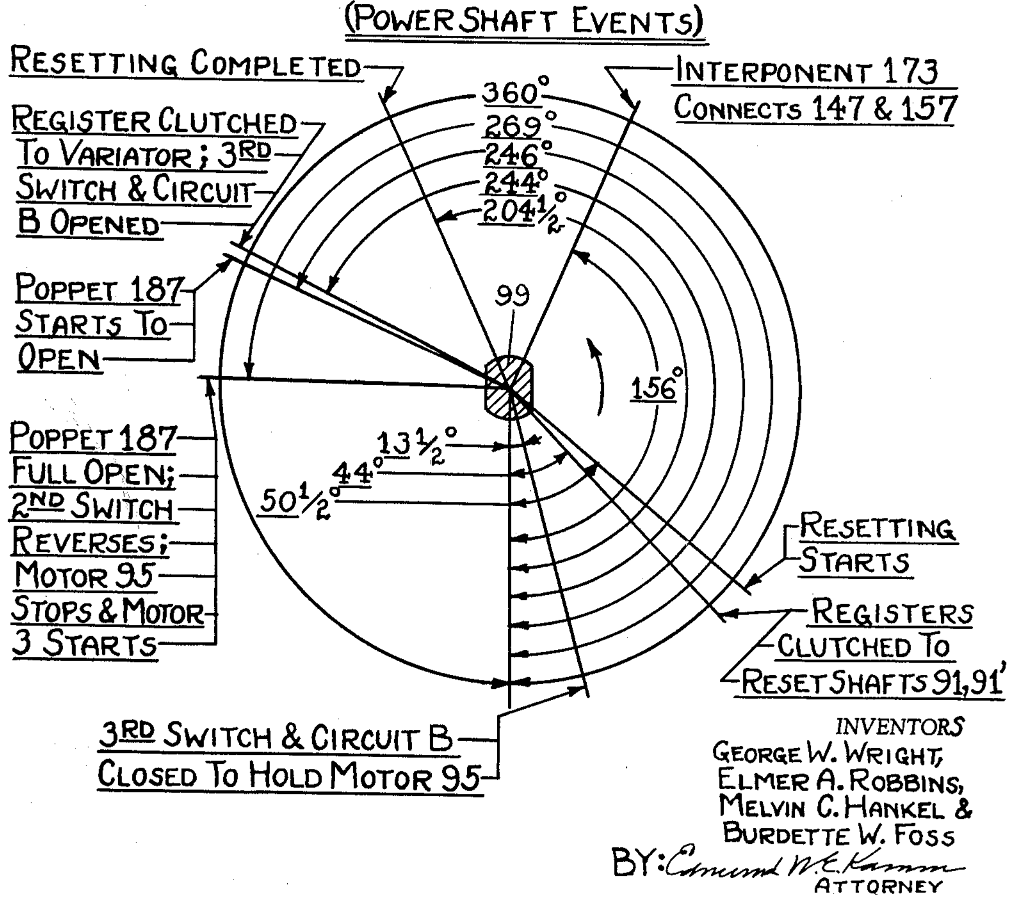
FIGURE 12 is a displacement diagram of the events which occur during a complete cycle of the power shaft.

Referring now to FIGURE 12, at about 13.5° of the rotation of the power and main register shafts, the contacts 221 of the 3rd switch 221 is closed and Circuit B is established to hold the resetting motor energized in case the manually operable 1st switch 135 should be opened before resetting is completed.

When about 44° of rotation are completed, cam 55 (FIG. 3) has shifted the clutch shafts 51 so that the registers are declutched from the variator drive trains and are clutched to the resetting shafts 91, 91'.

Rotation of the shafts to about the 50.5° position moves the locking flange 81 (FIGS. 6, 7 and 8) out of locking relation with the leading long tooth 77 of the pinion 75 and moves the leading tooth of the sector gear 74 into driving engagement with the short tooth 79 of the pinion which lies in its path, so that the resetting shafts will be operated to reset the registers to zero.

At about the 156° point of rotation of cam 150, which is about in the position shown in FIGURE 3A the cam follower 149 has been rotated clockwise by its spring 152 far enough to allow the abutment 186 of the interponent 173 to be pulled down behind the ear 155 on lever 147 by spring 181. The interponent will thus be conditioned to transmit thrust from lever 147 to lever 157, upon subsequent counterclockwise rotation of lever 147, to cause 157 to rotate in a similar direction.

When shafts 53 and 99 reach about the 204.5° point of rotation, the register resetting is completed and the trailing tooth 74 of the sector gear 73 leaves the pinion 75 while the locking flange 81 moves in to lock the pinion against rotation.

At about the 244° point, cam 55 has actuated the clutch shifting shafts 51 to connect the registers to be driven by the variator output trains. Also the drop R on cam 205 has passed follower 209 and spring 211 has rotated lever 207 clockwise to open the 3rd switch contacts 221 thus breaking Circuit B.

At a point in advance of the 244° point, cam 150 begins to rotate the levers 147 and 157, which are now connected by the interponent 173, in a counterclockwise direction. This action continues, and when about the 246° position is reached, the hub end of lever 173 has depressed plunger 161 far enough to begin to open the poppet 187 of the pilot valve 189.

This valve continues to open and the nose 159 of lever 157 approaches, contacts and finally, at about the 269° position, closes contacts 237 and opens contacts 227 of the 2nd switch 163. Circuit A to the resetting motor is opened and Circuit C to the pump motor is closed.

After the resetting motor has been deenergized and its brake automatically applied, the mechanism will coast to a stop somewhere between the 269 and the 360 degree positions of the shafts. The exact stopping point may vary somewhat in different structures but such variance is immaterial because no new event will occur in this portion of the cycle. The only effect will be a small difference in the time required for the power shafts to reach the 13.5° position for executing first event of a new cycle.

After the dispenser has been conditioned as described above, the opening of the nozzle valve will relieve the pressure in the chamber 197 of the control valve 13 (FIG. 4) causing poppet 193 to open so that liquid will flow out of the nozzle.

When the required amount of fuel has been delivered, the nozzle valve is closed, handle 29 is rotated clockwise (FIG. 3) to its initial position to clear the boot for the insertion of the nozzle which is then restored to its support 43.

Figure 11:
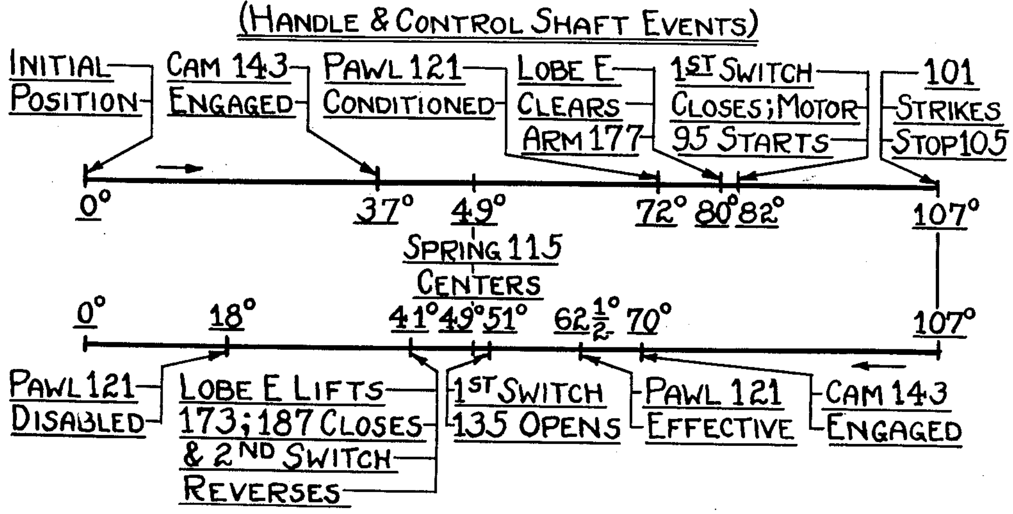
FIGURE 11 is a displacement diagram of the events which occur during a complete cycle of the control handle and shaft.

During such clockwise rotation of handle 29 and the control shaft 31, the events noted on the lower horizontal line of FIGURE 11 occur, reading in order from right to left thereof.

The rotation of the shaft 31 clockwise 37 degrees, to a position 70° from the initial position takes up the lost motion provided by slots 146 so that pin 145 is engaged with and is ready to rotate cam 143. The projection 141 on lever 137, which is entered in the notch D of the cam, resists premature frictional rotation of the cam by shaft 31.

During the next 7½ degree rotation to about the 62.5° position, the tooth 117 on element 100 passes the tip of the interlock pawl 121 which is then rotated to the FIGURE 10 position and will prevent subsequent counterclockwise rotation of handle 29 to the 82° position in which the switch 135 would be reclosed, unless the handle is first rotated clockwise at least to the 18° position, which is enough to cause the pawl 121 to retract to its FIGURE 3 position.

Upon further rotation of the handle through 11½ degrees to about the 51° position, 1st switch 135 snaps open and the pump motor 3 is deenergized.

The spring 115 centers when a further rotation of 3 degrees occurs to about the 49° position. A slight additional rotation will render this spring capable of returning the control shaft and handle to the initial position whenever the handle is released.

During the next 8 degrees of rotation to about the 41° position, cam lobe E engages arm 177 of the interponent lever 173 and rotates it counterclockwise about 175 to the point that it disengages the abutment 186 from ear 155 of lever 147. When this occurs, lever 157 rotates clockwise about 145, urged by its spring 167 with the result that both the 2nd switch 163 and plunger 161 are freed and return to their initial (FIG. 3) positions.

In the case in which the pilot and control valve shown in FIGURE 4 are used, the rising of the plunger and the closing of the poppet 187, effected by the valve spring 187', causes the balancing of the pressure across the piston 191 so that spring 203 will close the main valve 193.

The valve 187 cannot be opened again until the resetting cycle described above has been performed.

Upon further rotation to about the 18° position, the cam 119 of element 100 has moved the pawl 125 counterclockwise (FIG. 3) far enough to throw spring 129 across centers 127, 133 so that it will fully retract and hold the pawl in its initial, inoperative position. The spring 115 will continue the movement of the parts the final 9 degrees to their initial positions without performing any further events. This position is determined by the engagement of the end of projection 101 with stop 31 (FIG. 3).

The handle 29 is clear of the boot so that the nozzle may be inserted therein and mounted on its support. This completes the dispensing cycle.

It will be noted that once the control shaft reaches 51 degrees moving in a clockwise direction and stops the motor pump it cannot be returned counterclockwise past 62.5 degees to 82 degrees to reclose the motor switch.

In a system like that shown in FIGURE 1, even though motor 3 is deenergized additional fuel can be delivered if the pump motor is held energized by another dispenser and if the handle 29 is manually prevented from moving past the 41° position under the action of spring 109. It is physically difficult to so manipulate the dispenser and even if it is accomplished, the additional delivery will be accumulated on the registers so that no error or false registration can occur. The nozzle cannot be hung on its support with the lever in this position.

Once the control shaft reaches 41 degrees, the interponent lever is disengaged from lever 147, the valves 187 and 193 are closed and no further delivery can be made because these valves can be reopened only by cam 150 on the power shaft and since this occurs only after the registers have been completely reset and reclutched to the variator, the control shaft cannot be manipulated in any way to falsely increase the reading on the registers or to secure a delivery which is not properly registered. It will thus be seen that the structure described is suitable for use with registers which are zeroized by moving the dials in either a forward, reading increasing or a backward, reading decreasing direction.

It will thus be seen, in review, that the cycle for rendering the dispenser operative to dispense liquid is initiated by the movement of manually operable control means from an initial (0°) position to a dispensing (107°) position which starts the motor 95 to reset the registers and to establish control apparatus in actuated condition. This control apparatus may variably comprise a motor pump control circuit, a mechanically operated valve, a mechanically operated pilot valve which controls the hydraulic circuit of a servo main valve, a switch and main solenoid valve, a switch and a solenoid operated pilot valve for a servo main valve, etc. In addition the control apparatus may open the circuit initially established by the manual control means to perform other control functions which need to be executed as an adjunct to the cycle of the dispenser.

The operation of the control apparatus to actuated condition is effected by a power operated arm or lever which oscillates in a path and which must substantially reach one end of its path before an interponent can move to an effective position with respect to the arm. The interponent thereafter, transmits the motion of the arm, as it travels to the other end of its path, to establish the control apparatus in actuated condition to render the dispenser operative to discharge liquid. The interponent is capable of being withdrawn from its effective position by the return of the manual control means toward the initial position and when it escapes from the power actuated arm, it frees the control apparatus for return to normal condition to render the dispenser inoperative.

In addition to the provision of mechanisms to perform the basic functions noted above, certain additional devices such as the holding Circuit B and the interlock mechanism are provided which can be employed in various types of dispensers as and when they are required, to prevent the deliberate or accidental manipulation of the manual control means to produce a false reading on the registers which is detrimental to the purchaser of dispensed liquid.

Some of the various combinations and arrangements of these various mechanisms and circuits will be discussed below in order to explain how they can be combined with the basic structures to attain the desired results.

*Motor pump dispensers*

The structure described above pertains specifically to a dispenser which is used with one or more other similar dispensers which are supplied from a single, usually remotely located, motor pump. In the case of a dispenser which incorporates a motor pump or which is otherwise connected so as to be the sole outlet for the pump which supplies it, it is unnecessary to use a control valve system like that of FIGURE 4 or its equivalent, because once either the contacts 223 of the first switch or 237 of the second switch are opened the pump cannot be restarted without having first reset the registers to zero.

In such motor pump dispensers, the plunger 161, valves 13 and 189 or equivalent valves, and other associated parts can be omitted entirely, along with their functions. The structure and its cycle is otherwise exactly the same as that which has been described.

*Equivalent flow control valves*

Figure 14:
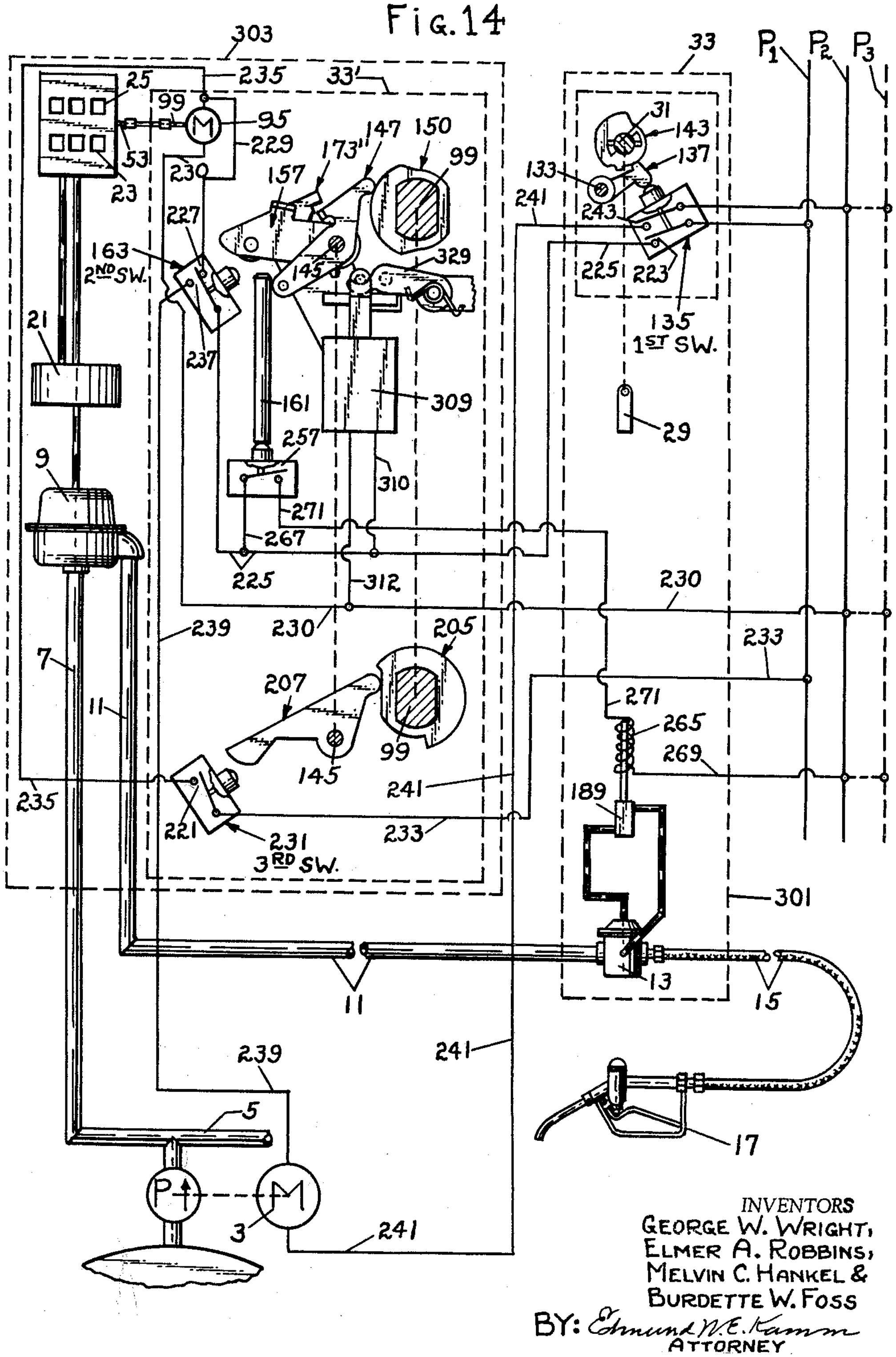
FIGURE 14 is a diagrammatic view of a remote registration system having a power reset mechanism and having a control valve disposed adjacent the hose outlet.

Instead of the hydraulic control valve system shown in FIGURE 4, a main control valve like 260 of FIGURE 14 of our prior application may be opened directly by the plunger instead of by a hydraulic motor. As a further alternative a solenoid valve system shown in FIGURE 5 may be provided.

In the latter case, the plunger 161 is preferably provided with a snap ring 251 and a spring 253 which urge the plunger upwardly and with a snap ring 255 which limits such motion. Instead of the pilot valve 189, a normally open snap switch 257 is mounted in a container 259, which is fixed to box 33, and its actuator 261 disposed for operation by the plunger. A valve 263, which takes the place of valve 13, of any desired type is provided which has a solenoid or other motor 265 mounted so as to open and close the valve when switch 257 is closed and opened respectively.

Wires 267 and 269 are connected to power mains P1 and P2 if the solenoid requires 230 volts or P1 and P3 if it requires 115 volts. Line 271 completes the circuit from the switch to the solenoid.

The valve 263 would therefore be opened at the 269° point of the power shaft cycle, which is the equivalent of the point at which the pilot valve 187 is fully open.

Figures 5, 17:
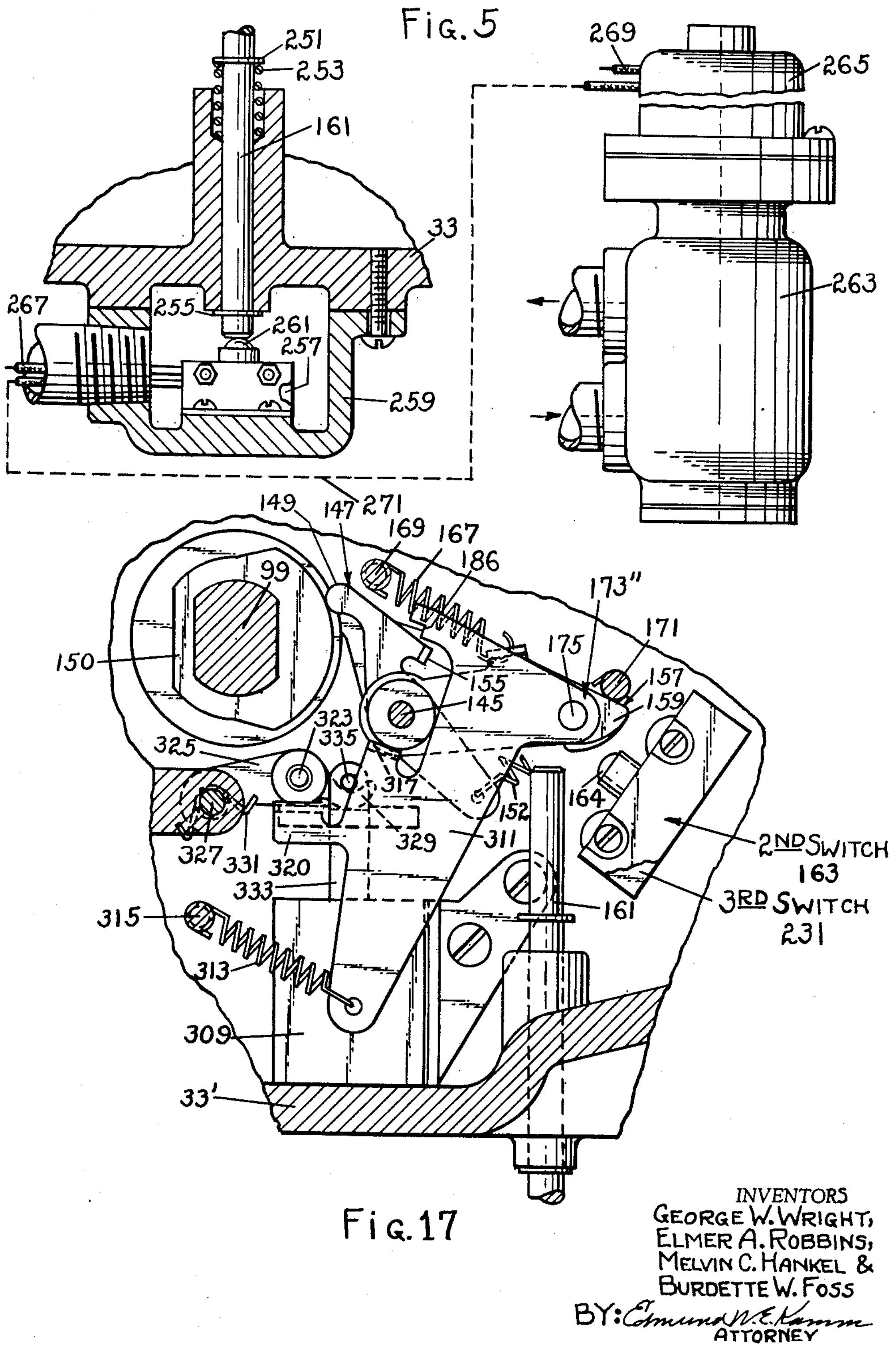
FIGURE 5 is a view, partly in section, showing another form of control device for actuating a solenoid control valve or some other form of remote control element.
FIGURE 17 is a view showing solenoid operated means for controlling the interponent lever of the compound lever system which operates the 2nd switch and which is used with the FIGURE 14 and FIGURE 15 structures.

As a further alternative the valve 189 (FIG. 14) could be fitted with a small solenoid 265 which would be operated by switch 257 as shown in FIGURE 5. This valve could serve in the same capacity as the pilot valve 187 and could be used to control the main control valve 13 shown in FIGURE 4 which could be located remotely with respect to the meter as shown in FIGURE 14 if desired.

No control valve is needed for a motor pump dispenser for the reasons stated above.

*1st modified structure (FIG. 13)*

Figure 13:
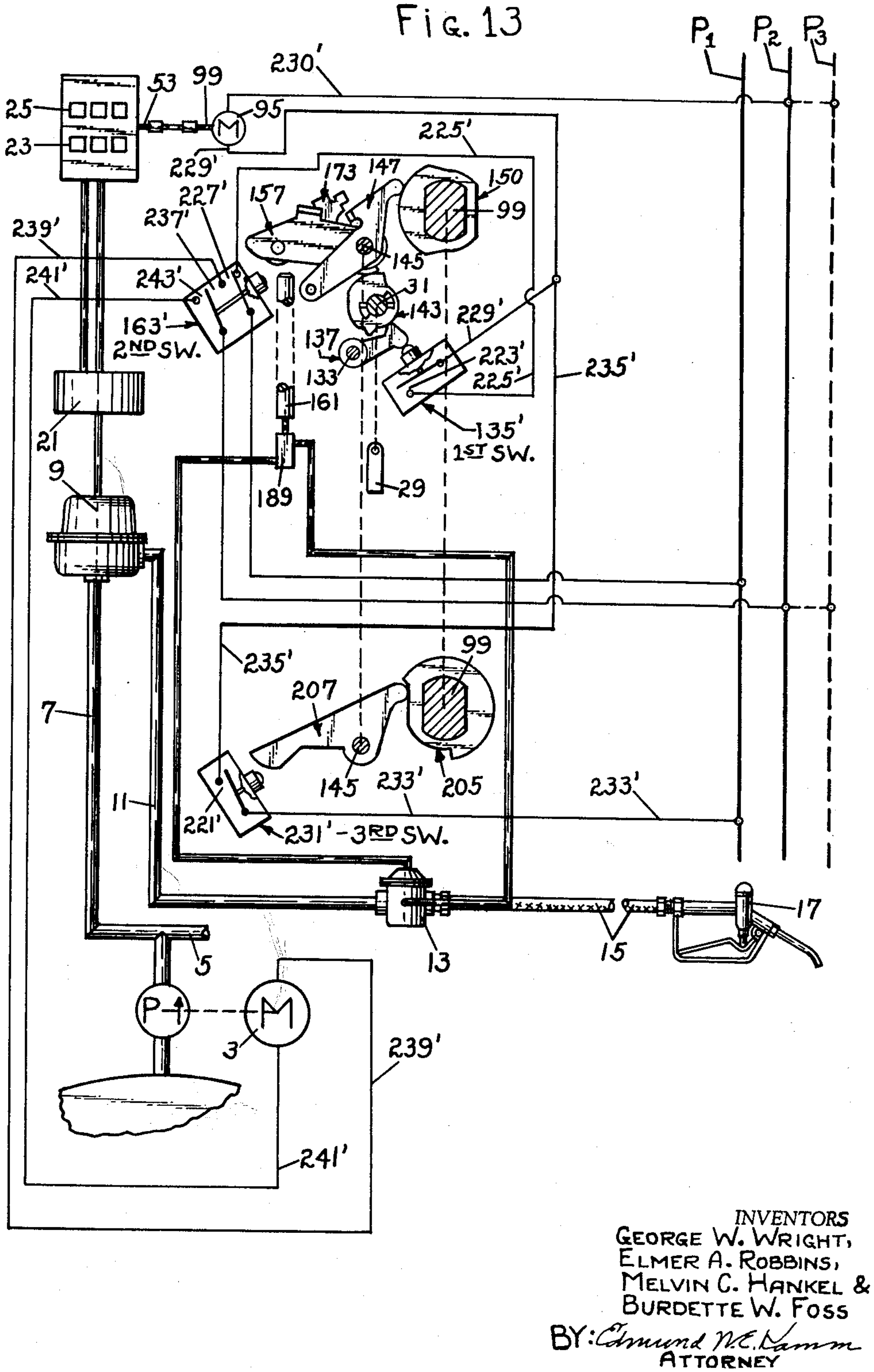
FIGURE 13 is a diagrammatic view of a modified form of the structure shown in FIGURE 3.

A modified resetting structure for a pedestal similar to that of FIGURE 1, which is intended for use in a multiple outlet system, is shown in FIGURE 13.

In this structure the 1st switch 135′, which is actuated by cam 143 of the control shaft 31, has a single set of normally open contacts 223′ which are connected in series with the resetting motor 95 and with normally closed contacts 227′ of the 2nd switch 163′. The normally open contacts 237′ and 243′ also incorporated in the 2nd switch 163′ are connected in series with the motor pump and are operated by cam 150 and the compound interponent controlled lever 147, 157, 173 so that the contacts 227′, 237′ and 243′ are actuated simultaneously.

The 3rd, holding circuit switch 231′ has normally open contacts 221′ connected in series with resetting motor 95. The interlock structure 117, 125, 119, 129 (FIG. 3) is eliminated because the pump motor switch is no longer controlled by the control shaft 31.

The following circuits are controlled by the switches and are comparable in function to the similarly lettered circuits of the FIGURE 1 structure:

Circuit A′ extends from P1 through normally closed contacts 227′ of the 2nd switch, line 225′, contacts 223′ of the 1st switch, line 229′, resetting motor 95 and line 230′ to P2 in the case of a 230 volt system or to P3 in a 115 volt system.

Circuit B′ extends from P1 through line 233′, the contacts 221′ of the 3rd switch, through lines 235′ and 229′, resetting motor 95 and line 230′ either to P2 or to P3.

Circuit C′ extends from P1 through normally open contacts 237′ of the 2nd switch, line 239′, pump motor 3, line 241′, normally open contacts 243′ of the second switch to P2 for a 230 volt system or to P3 for a 115 volt system.

*Operation*

The operating cycle is generally like that of FIGURES 1 and 3, since counterclockwise rotation of the handle 29 and control shaft 31 will perform the following events shown on the diagram in FIGURE 11:

(A) Shaft 31 picks up cam 143 at about 37 degrees.

(B) Spring 115 centers at about 49 degrees. (Pawl 121, tooth 117, and cam 119 are omitted.)

(C) Lobe E clears arm 177 at about 80 degrees.

(D) Contacts 223′ of the 1st switch close at about 82 degrees to energize Circuit A′ for the resetting motor which rotates the power shafts 53, 99.

(E) Stops 101, 105 stop rotation of the control shaft at about 107 degrees.

The starting of the motor 95 and the rotation of the power shafts 53, 99 causes a cycle similar to that charted in FIGURE 12 to be completed as follows:

(A) The 3rd switch contacts 221′ close at about 13.5 degrees to establish the holding Circuit B′ for motor 95.

(B) The next six events shown in FIGURE 12 which are caused by cams 150 and 205 occur in order at the times shown on the chart.

(C) The seventh event which occurs at the 269 degree position at cam 150 and which calls for the reversal of the 2nd switch, opens contacts 227' to break Circuit A' and closes contacts 237' and 243' to establish the pump motor Circuit C'. In other words contacts 243' which are now located at the 2nd switch perform the same function as contacts 243 which were incorporated in the 1st switch of the apparatus shown in FIGURE 3.

After a delivery is completed the control shaft 31 is rotated clockwise to its initial position through the following events:

(A) Shaft 31 picks up cam 143 at about 70 degrees from zero. (Pawl 121 is omitted.)

(B) Cam 143 opens contacts 223' of 1st switch 135' at about 51 degrees.

(C) Lever 109 centers spring 115 at about 49 degrees.

(D) Lobe E disables the interponent 173 at about 41 degrees, which causes the pilot valve to close, the 2nd switch contacts 237', 243' to open and interrupt Circuit C' and contacts 227' to close and condition Circuit A' for subsequent closing.

(E) Stops 101, 103 stop the parts in the initial position.

The interlocking mechanism (pawl 121, etc.) may be omitted as suggested because moving shaft 31 back and forth between the 51°–82° positions to open and reclose contacts 223' of the 1st switch has no effect since switch 227' is open during dispensing. Should the shaft be moved to the 41° position and back to the 82° position, the 2nd switch will have been released by the compound lever and contacts 227' will be closed. Accordingly, the described action will merely cause a complete resetting cycle via Circuits A' and B'. Again, this form of the device may be used with either forwardly or rearwardly resetting registers, and it cannot be manipulated to produce a false registration or secure a delivery without registering such delivery.

As before, the above described 1st modified structure may be used on a motor pump dispenser, and in such case the plunger 161 may be omitted along with whatever control valve may have been used on the pedestal.

*2nd modified structure*

A further variation of the 1st modified structure shown in FIGURE 13 is possible, provided that the shafts 53, 99, 91 and 91' are operated only in a direction which will reset the registers in a backward, reading reducing direction. It consists of the elimination of the holding Circuit B' along with the cam 205, follower lever 207, spring 211 and the 3rd switch 231', as well as the interlock mechanism 117, 119, 125 and 129.

It will be seen from the diagram, FIGURE 12, that 3rd switch contacts 221' are closed when the power shafts 53, 99 have rotated about 13.5 degrees from their zero positions to establish the Circuit B' which maintains the resetting motor 95 enerzied until the shafts reach about their 244 degree positions. The function of this circuit is to insure that, if the control shaft 31 has been rotated counterclockwise far enough to close the 1st switch and Circuit A' for a short time and is then returned to its initial position, the resetting motor will be held energized long enough to at least complete the register resetting function.

In determining the effect of eliminating the holding Circuit B' from the 1st modified structure, bearing in mind that the interlock lever 125 is omitted, consideration must be given to the various possible ways in which the lever 29 and shaft 31 could be operated.

(1) If the intended pattern is followed, of rotating lever 29 from zero to the 107° position, allowing the resetting motor to complete its cycle and returning it thereafter to the zero position with or without a delivery, (A) Both the 1st and 2nd modified structures will have performed a complete cycle and all of the parts will have returned to their initial positions except the registers which will be zeroized if there was no delivery or will register whatever delivery has been made.

(2) If the intended pattern is not followed and the lever 29 is moved far enough to close the first switch, the switch is held closed until the resettting motor has completed its cycle (in which case the 2nd switch has opened contacts 227' and closed 237' and 243') and the lever is returned far enough to open the 1st switch but not far enough to restore the second switch to its initial condition and is held there.

(A) In both modified structures this will accomplish nothing but the zeroizing of the registers and the starting of the pump motor and if any delivery is made it will be registered.

(3) Moving the handle from the held position, assumed in item 2 past the 82° position to reclose the 1st switch will have no effect in either structure since Circuit A' is already opened by contacts 227'.

(4) Returning the handle from the held position assumed in item 2 toward the zero position through the 41 degree position will merely restore the 2nd switch to its initial position and will produce no undesirable result in the case of either structure, because any subsequent counterclockwise rotation will merely start a complete new cycle.

(5) If the lever 29 is moved from zero past the 82° position to close the 1st switch long enough to allow motor 95 to pass its 50.5° position (FIG. 12) and is then moved toward zero past the 51° position to reopen the 1st switch:

(A) In the 1st modified structure the action described will not stop the motor 95 because the 3rd switch will have been closed and holding Circuit B' will hold the motor energized until after resetting is completed. Accordingly, either forward or backward resetting registers may be used.

(B) In the 2nd modified structure, however, the manipulation described will interrupt Circuit A and deenergize the motor 95 which will coast to a stop. It could thus result in a partial resetting of the registers. Accordingly, if the registers are of the forward resetting type, this manipulation could result in a higher reading on the registers. If such a manipulation were performed after a delivery had been made, it could produce a false reading in favor of the seller. However, if backward setting registers are used, the manipulation will produce a lower reading which is against the interest of the seller and the structure therefore meets Weights and Measures Regulations.

The holding Circuit B of the structure shown in FIGURE 3 could be similarly eliminated if backward resetting registers are used for the same reasons just set forth. However, in this case, since the contacts 243 of the 1st switch control the pump motor circuit once the registers have been reset and the contacts 237 have been closed, it might be possible by moving the handle 29 back and forth between the 82° and the 51° positions, to start and stop the pump motor without resetting of the registers. Accordingly, in this case, it would be advisable to retain the interlock lever 125 and its associated parts to prevent the reclosing of the 1st switch until the 2nd switch has been restored to its initial condition, so as to cause a resetting cycle to occur before the pump motor can again be energized.

*Remote registration system (FIG. 14)*

The above described structures relate to dispensers in which the registers, resetting mechanism, meter and hose, etc., are included in one package or unit, so that the connections between the control shaft and power shaft mechanisms can be direct mechanical linkages.

However, remote registration systems are contemplated in which the registers are located at a point remote from the hose outlet and one form of such system is shown in FIGURE 14 which shows two units 301 and 303 which may be separated by any reasonable distance. The system shown in FIGURE 14 is based on the circuitry shown in FIGURE 3, the power unit shown in that figure being modified as shown in FIGURE 17.

The unit 301 as shown contains the control valve 13 which is connected to the meter discharge line 11 and to the hose 15 and nozzle 17. It contains an explosion proof box 33 previously described which contains only the 1st switch 135, shaft 31, cam 143, actuator 137, member 100, stops 103, 105, the interlock mechanism 125, the overcenter lever 109 and their associated springs, etc., as shown in FIGURES 2 and 3. Handle 29, boot 37, and nozzle support 41 are disposed exteriorly of the housing.

The unit 303 contains the meter 9, variator 21, registers 23, 25 and an explosion proof box 33', like 33, in which are housed the reset motor 95, 2nd switch 163, 3rd switch 221, if a holding Circuit B is to be used, plunger 161, a compound lever 147, 157, 173', cams 150, 205, the follower lever 207, and an interponent control solenoid 309, along with the necessary springs, etc. Cam 205 and lever 207 will, of course, be omitted if the holding circuit is omitted.

When the control valve system shown in FIGURE 4 is used, the solenoid 265 (FIG. 5) may be provided inside or outside of the box 33 to operate the poppet 187 of the pilot valve 189. If a different valve system is used, such as that shown in FIGURE 5, the solenoid or other motor would usually be mounted on the main valve 263 directly. Of course, any suitable valve system may be used so long as it is motorized for remote operation under the control of motor 95.

Since the cam 143 for the 1st switch is not disposed in unit 303, and since the solenoid 309 must be used to operate the interponent lever 173'', this lever has been modified slightly as shown in FIGURE 17.

This interponent lever is still pivoted at 175 on lever 157 and retains the abutment 186. It has a downwardly extending arm 311 which is connected to one end of a tension spring 313, the other end of which is anchored at 315 to the box. It also has an ear 317 which extends underneath pin 145 and the hub 319 of lever 147 which the ear engages to limit the rotation of the interponent lever by the spring.

The interponent lever also has a laterally extending arm 320 which is in the path of a pin 323 projecting from a lever 325 at a point intermediate the ends thereof. One end of the lever 325 is pivoted on the box at 327 and has its free end formed as an upwardly open hook 329. A spring 331 urges the free end of the lever upwardly.

The solenoid 309 is fixed to the bottom flange of the box and has a reciprocable armature 333, the upper end of which carries a pin 335 which projects across and engages hook 329.

When the solenoid is energized, its armature 333 and pin 335 move downwardly through a part of their stroke to rotate lever 325 clockwise (FIG. 17), causing pin 323, acting on arm 320, to rotate the interponent lever counterclockwise. This rotation brings the edge of lever 173'', which is adjacent the bottom end of abutment 186, to rest on the ear 155 of lever 147. The solenoid is held energized so that when lever 147 rotates to its FIGURE 3A position, the abutment will be pulled in behind the ear by the solenoid. Clockwise rotation (FIG. 17) subsequently imparted to lever 147 by cam 150 will be transmitted to lever 157 to actuate control apparatus such as the 2nd switch and plunger 161. When the solenoid is deenergized, the spring 313 will rotate the interponent lever clockwise (FIG. 17) relative to lever 147 to withdraw the abutment 186 from behind ear 155, allowing lever 157 to be rotated counterclockwise by its spring 167 in the same manner as described above to restore the control apparatus to its normal condition.

Referring again to FIGURE 14, the Circuits A'', B'' and C'' perform the same functions as Circuits A, B, C above, with the Circuit B'' optionally used or omitted as the direction of resetting of the registers may permit. The following description of the circuits is based on the pattern of FIGURE 3, with the holding circuit and with the interlock.

Circuit A'' is from P1 through contacts 223 of the 1st switch, line 225, contacts 227 of the 2nd switch, line 229, resetting motor 95, line 230 to P2 for a 230 volt circuit or to P3 for a 115 volt circuit. This starts motor 95 to close the 3rd switch 231.

Circuit B'' is a holding circuit from P1 through line 233, 3rd switch 221, lines 235, 229, motor 95, line 230 to P2 or P3.

Circuit C'' is the pump motor circuit from P1 through contacts 223 of the 1st switch, line 225, contacts 237 of the 2nd switch, line 239, pump motor 3, line 241, contacts 243 of the 1st switch and to P2 or P3.

Since the above circuits are exactly the same as those of FIGURE 3, the same characters have been used to designate them.

Circuit D'' is for solenoid 309 (FIG. 17) and runs from P1 through 223, lines 225 and 310, solenoid 309, lines 312 and 231 to P2 or P3. Thus the solenoid is energized from the time that contacts 223 of the 1st switch are closed until they are reopened. However, as soon as they do reopen the solenoid is deenergized, the abutment 186 of interponent lever 173' is withdrawn from ear 155 of lever 147 and the 2nd switch and plunger 161 are returned to their initial positions.

Circuit E'' is provided for the valve solenoid 265 and extends from P1 through 223 of the 1st switch lines 225, 267, 4th switch 257, line 271, solenoid 265 to P2 or P3.

*Operation*

(1) Lever 29 and shaft 31 are rotated from zero position to the 107° position of FIGURE 11 producing the same events as are shown on the chart in this figure except that produced by lobe E at the 80° position. In addition to closing Circuit A'', the closure of contacts 223 of the 1st switch energize the solenoid 309 to urge the interponent lever 173'' toward engagement of abutment 186 with ear 155 of lever 147.

(2) The closure of Circuit A'' starts the motor 95 which rotates the shafts 53, 99 through the cycle of events shown in FIGURE 12 with the difference that the 7th event, the start of opening of the pilot valve 189, at 246° is omitted. Instead the switch 257 is closed by plunger 161 to energize Circuit D'' and solenoid 265 at about the 269° point. The other events listed at the 269° point will of course occur.

(3) Whether or not a delivery has been made, when lever 29 and shaft 31 are rotated from the 107° position back to zero, the events listed along the bottom line of the chart, FIGURE 11, will occur as indicated with the exceptions that at the 51° position, not only does the opening of switch 135 open the pump motor Circuit C'' but also the Circuit D'' with the result that solenoid 309 is deenergized to allow spring 313 to move interponent 173'' out of effective position and thereby restore arm 157 and the control apparatus to normal condition i.e. contacts 237 open, 227 close, 257 open and valves 189 and 13 close.

For the reasons explained above in connection with FIGURE 3, manipulation of lever 29 cannot produce either a false reading of the register or secure the delivery of fuel without first resetting the registers.

Again as before, the Circuit B'' and its components may be omitted if the registers used are reset in the backward reading decreasing direction. The interlock 125 could also be eliminated along with its events in a unit using backward resetting registers because as soon as the 1st switch 135 is opened the control apparatus is automatically restored to its normal condition and cannot be returned to actuated condition without first going through the resetting cycle.

It is, of course, obvious that if the pilot valve 189 and control valve 13 or a mechanically operated control valve are disposed in the housing 303 instead of in the housing 301, the plunger 161 may actuate the valve used directly thus eliminating the Circuit E'' entirely along with its necessary components.

It will also be ovious that Circuit E'' may be retained and its valve apparatus may be disposed in the housing 303 or elsewhere in the line 11 than in housing 301 as described above.

*1st modified remote system (FIG. 15)*

Figure 15:
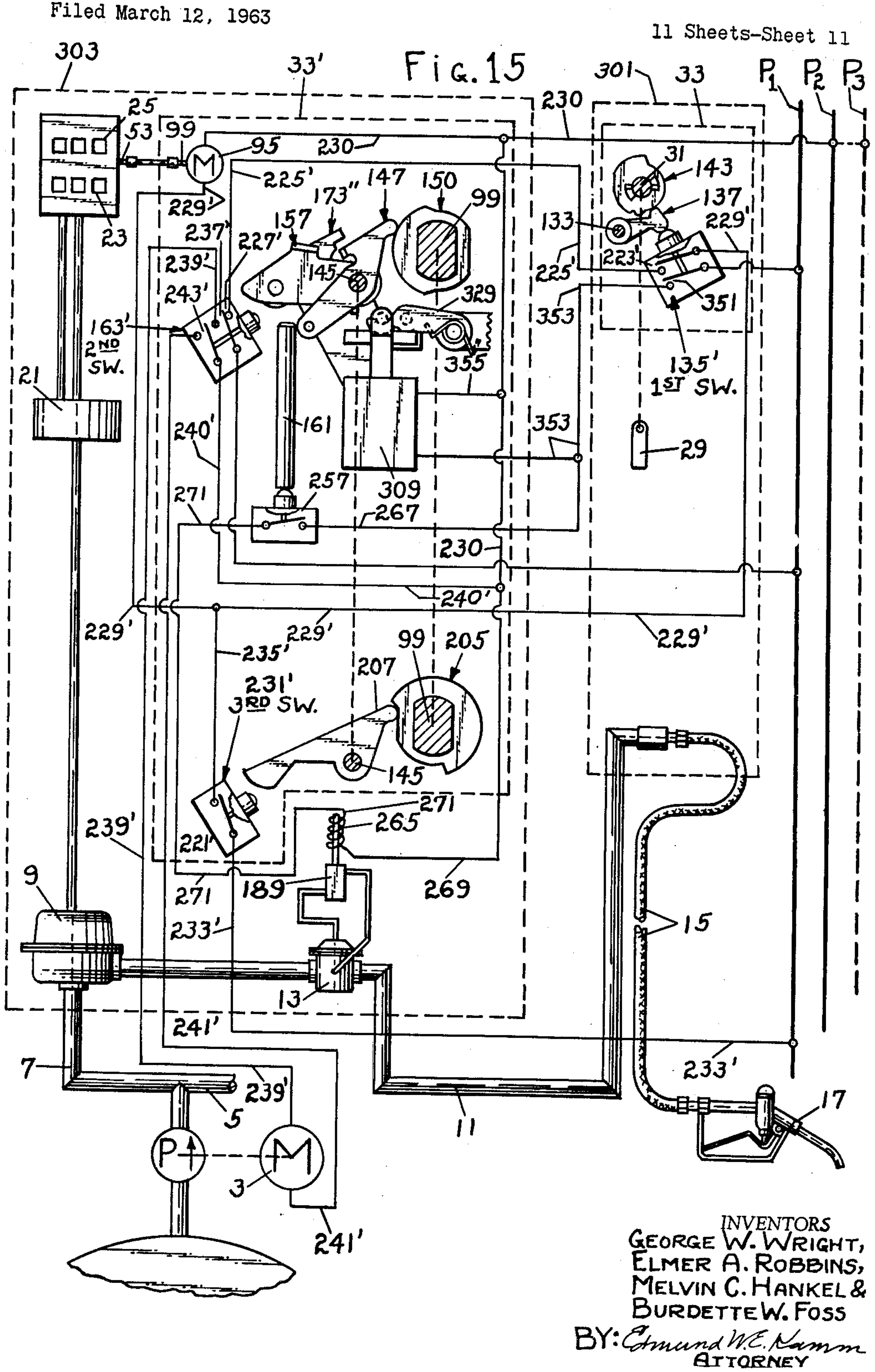
FIGURE 15 is a diagrammatic view similar to that of FIGURE 14 with the control valve disposed adjacent the meter.

A remote system patterned upon the structure and circuitry of FIGURE 13 is shown in FIGURE 15. Similar parts have been given the same numerals as those in FIGURE 13 for ease of identification. The control valve is shown disposed in the metering and registering housing 303 instead of in the dispenser housing 301. It is also shown as with a solenoid operated pilot valve 189 instead of one which is operated directly by the plunger 161 to show how such a valve would be connected in the circuitry. A plunger operated pilot valve like that shown in FIGURES 3 and 13 could, of course, be used because it is located in the same housing as the plunger.

The circuits are as follows:

Circuit A' from P1 through contacts 227' of the second switch, line 225', contacts 223' of the 1st switch, line 229', resetting motor 95 and line 230' to either P2 or P3.

Circuit B' is the holding circuit which, if it is used, extends from P1 through line 233', contacts 221' of the 3rd switch, lines 235', 229', resetting motor 95 and line 230' to P2 or P3.

Circuit C' for the pump motor extends from P1 through contacts 237' of the 2nd switch, line 239', motor 3, line 241', contacts 243' of the 2nd switch to P2 or P3. In this case the latter connection is by way of lead 240' and the line 230'.

Circuit $D^2$ for the interponent solenoid 309 requires an additional, normally open contact 351 in the 1st switch 135'. This circuit is from P1, through 351, line 353, solenoid 309 through 355 and 230' to P1 or P2.

Circuit $E^2$ for the control valve solenoid is from P1 through the extra contact 351 of the first switch, lines 353, 267, switch 257, line 271, solenoid 265, lines 269 and 331' to P2 or P3.

*Operation*

Referring to the diagram of FIGURE 11, the rotation of handle 29 and shaft 31 will take up the lost motion and pick up cam 143 at the 37° point and center spring 115 at 49°. The interlock mechanism 125 is omitted for the reasons set forth under the description of the FIGURE 13 circuit. The event noted at 80° does not occur here, but as soon as the 82° position is reached, contacts 223' and 351 of the 1st switch close to energize both Circuits A' and $D^2$ for the resetting motor and the interponent solenoid respectively and thereafter the handle moves to the 107° position determined by stops 101, 105.

The motor 95 then performs the events of FIGURE 12 closing holding Circuit B' if it is used because a forward resetting register is employed.

The first six events shown on FIGURE 12 occur as there shown, and the seventh event occurs at 269° instead of at 246°, when the reversal of the 2nd switch and the closure of switch 257 occur substantially simultaneously. The second switch breaks the resetting motor Circuit A' and closes the pump motor Circuit B' while switch 257 energizes Circuit $E^2$ to cause the control valve to open.

Whenever, the 1st switch is opened, whether or not delevery has ben made, Circuits $D^2$ and $E^2$ are both opened. The solenoid 309 is deenergized and spring 313 withdraws the interponent so that the control apparatus resumes its normal condition i.e. contacts 227' closed and 237', 243' open. Switch 257 will also be opened although, of course, the Circuit $E^2$ through this switch was previously opened when contacts 351 of the 1st switch were opened. Accordingly, if the 1st switch is reclosed, all that can result is another complete cycle.

It may, of course, be desirable to have the overcentering action of spring 115 occur, on the off stroke of lever 29, at a point prior to the opening of the 1st switch, say at 55 degrees so that if the lever is released at say 52 degrees, the opening of the 1st switch will be effected automatically. The advantage of such an arrangement is that an accidental release of the lever after the first switch had been manually opened would not result in automatic reclosing of the switch and a consequent loss of the registered amounts by an undesired resetting of the registers. The same consideration applies to the circuitry of FIGURE 13.

However, this is an optional matter and the point at which the spring 115 crosses the centerline of pin 13 and lever 109 can be varied by pinning the lever to shaft 31 in the proper rotational position to secure the result desired.

As in the case of the FIGURE 13 structure, it is advisable to provide the holding circuit in the structure just described, if forward resetting registers are used because the Circuit A' can be energized and deenergized by manipulation of the handle 31, and it might be used to post a higher registration than that effected by the meter during a delivery. With backward resetting registers, the holding circuit may be omitted. The interlock mechanism 125 is not required because the handle cannot be manipulated to stop and start the pump motor 3 without causing a resetting operation.

Since it is obvious that various changes may be made in the form, construction and arrangement of the various parts and circuits disclosed herein without departing from the spirit of the invention, applicants do not wish to be limited to the exact forms of the invention disclosed herein but desire protection falling fairly within the scope of the appended claims.

What we claim as our new and useful invention is:

1. In a power operated registering apparatus, the combination of a frame, (a) a resettable register rigidly mounted on said frame and including
  (1) a number of numeral bearing indicators having a zero indicating position,
  (2) a rotary drive shaft connected by first, normally effective releasable clutch means to advance the indicators,
  (3) a rotary resetting shaft connectable by second, normally released clutch means to reset said indicators to zero indicating position,
  (4) clutch actuating means operable in a cycle to release said first clutch means and substantially simultaneously render said second clutch means effective, to hold said clutches released and effective respectively, and to thereafter restore them to their normal conditions,
  (5) a rotary main shaft connected to drive said clutch actuating means,
  (6) means connecting said main shaft to actuate said resetting shaft, during the held condition of said clutch means, to restore said indicators to zero indicating position, (b) a power resetting unit rigidly mounted on said frame, independently of said register, said unit including
  (1) an electric motor and a rotary power shaft connected to be driven by said motor, and (c) flexible shafting connecting said power shaft to rotate said main shaft, said shafting serving to prevent strains applied to either said register or said unit from being transmitted to the other.

2. In a power operated registering apparatus, the combination of a frame, (a) a resettable register rigidly mounted on said frame and including (1) a number of numeral bearing indicators each having a zero indicating position, (2) a rotary drive shaft connected by first, normally effective clutch means to advance the indicators, (3) a rotary resetting shaft connectable by second, normally released clutch means, to return said indicators to zero indicating position, (4) clutch actuating means operable in a cycle to release said first clutch means and substantially simultaneously render said second clutch means effective, to hold said clutches released and effective respectively, and to thereafter restore them to their normal conditions, (5) a rotary main shaft connected to drive said clutch actuating means, (6) means connecting said main shaft to actuate said resetting shaft, during the held condition of said clutch means, to restore said indicators to zero indicating position, (b) a measuring device mounted on the frame and connected to operate said drive shaft, (c) means, including a control apparatus, for conditioning said measuring device for operation, (d) a power resetting and control unit rigidly mounted on said frame, independently of said register, said unit including (1) an electric motor and a rotary power shaft connected to be driven by said motor, (e) flexible shafting connecting said power shaft to rotate said main shaft, said shafting serving to prevent strains applied to either said register or said unit from being transmitted to the other, (f) and means actuated by said power shaft for operating said control apparatus to condition said measuring device for operation, after restoration of said clutches to their normal conditions.

3. In a power operated registering apparatus, the combination of a frame, (a) a resettable register rigidly mounted on said frame and including (1) a number of numeral bearing indicators having a zero indicating position, (2) means operable to advance the indicators, (3) means operable to reset said indicators to zero indicating position, (4) a rotary main shaft connected to drive said resetting means, (b) a power resetting unit rigidly mounted on said frame, independently of said register, said unit including (1) an electric motor and a rotary power shaft connected to be driven by said motor, and (c) flexible shafting connecting said power shaft to rotate said main shaft, said shafting serving to prevent strains applied to either said register or said unit from being transmitted to the other.

4. A liquid dispensing apparatus including dispensing control apparatus, a resettable register, and power means for resetting said register and operating said apparatus, (a) said register having a number of numeral bearing indicators having zero indicating positions, a drive shaft, and means for advancing said indicators in proportion to the operation of said drive shaft, (1) means including a rotatable resetting shaft for resetting said indicators to zero indicating position, (b) said control apparatus having a normal condition and an actuated condition, actuating means for establishing said control apparatus in said actuated condition, (1) said control apparatus including switch means having a set of normally closed contacts and a set of normally open contacts, (c) said power means including an electric motor, a power shaft connected for operation by said motor, (1) means connecting said power shaft to operate said resetting shaft, (d) said actuating means for said control apparatus having an arm mounted for actuation in a path and means operable by said power shaft for causing oscillation of said arm through said path, (1) an interponent mounted for movement to and from an effective position in the path of said arm for movement thereby to establish said control apparatus in said actuated condition, (2) means for urging said interponent toward its effective position, (3) means for preventing movement of said interponent to its effective position except when said arm is adjacent one end of its path, (e) manually operable control means mounted for movement between an initial and a dispensing position, (1) a normally open switch, means operable by said control means, as it approaches its dispensing position, for closing said normally open switch, (f) means connecting said closed contacts with said normally open switch and said electric motor to energize said motor when said switch and said normally closed contacts are closed, (1) said motor serving to operate said power shaft to reset said register indicators to zero and to move said arm first to said one end of its path to permit movement of said interponent to its effective position and thereafter to the other end of its path to establish said control means in said actuated position, (2) said control means in said actuated condition serving to reverse said contacts to deenergize said electric motor and to close a control circuit for said dispenser.

5. The structure defined by claim 4 wherein said control circuit includes a second normally upon switch operable substantially simultaneously with the first switch, said second switch being connected in series with said normally open contacts.

6. The structure defined by claim 4 wherein said power is applied through said normally closed contacts to said normally open switch when said switch is closed.

7. The structure defined by claim 6, wherein said register is resettable to zero in a count increasing direction and which includes means responsive to starting of said motor for holding said electric motor energized until the resetting of said registers is completed.

8. The structure defined by claim 4 wherein power is applied through said normally open switch, when said switch is closed, to said closed contacts.

9. The structure defined by claim 8 wherein said register is resettable to zero in a count decreasing direction and which includes, (a) a motor driven pump for supplying liquid to said dispenser, a second normally open switch, operable substantially simultaneously with said first mentioned normally open switch and connected with said normally open contacts and said pump motor, for starting said pump motor, when both said second switch and said contacts are closed, (1) said control apparatus serving to close said normally open contacts when said control apparatus is in actuated condition, (b) means responsive to the approach of said manually operable control means toward its initial position for first opening said first normally open switches and for thereafter moving said interponent from its effective position, and (c) interlocking means for preventing movement of said manually operable control means to reclose said normally open switches without first moving said interponent from its effective position to cause said control apparatus to return to said normal condition and to open said normally open contacts.

10. The structure defined by claim 8 wherein said register is resettable to zero in a count increasing direction and which includes, (a) a motor driven pump for supplying liquid to the dispenser, a second normally open switch connected for operation substantially simultaneously with said first mentioned normally open switch and connected with said normally open contacts and said pump motor, for starting said pump motor, when both said second normally open switch and said normally open contacts are closed, (1) said control apparatus serving to close said normally open contacts when said control apparatus is in actuated condition, (b) means responsive to the approach of said manually operable control means toward its initial position for first opening said normally open switches and for thereafter moving said interponent from its effective position, (c) interlocking means for preventing movement of said manually operable control means to reclose said normally open switches without first moving said interponent from said effective position to cause said control apparatus to return to said normal condition and to open said normally open contacts, and (d) means operable after the starting of said electric motor for holding said motor energized long enough to complete the resetting of said indicators to zero.

11. The structure defined by claim 4 wherein said means for urging said interponent to its effective position comprises a second electric motor, (a) a second normally open switch disposed for operation substantially simultaneously with said first normally open switch, (b) and means for energizing said second electric motor when said second normally open switch is closed.

12. The structure defined by claim 11 wherein said dispenser comprises a delivery line terminating in a hose disposed at a point remote from said register and wherein said motors, power shaft, and control apparatus are disposed adjacent said register while said manually operable control means and said normally open switches are disposed adjacent said hose.

13. The structure defined by claim 12 which includes a control valve for said delivery line, for starting and stopping the flow of liquid therethrough and, (a) means responsive to said control apparatus in its normal and actuated conditions for respectively closing and opening said control valve.

14. The structure defined by claim 13 wherein said valve is disposed adjacent said hose.

15. The structure defined by claim 13 which included a meter in said delivery line connected to drive said register drive shaft and wherein said valve is disposed adjacent said meter.

16. The structure defined by claim 4 which includes means responsive to the approach of said manually operable control means toward its initial position for moving said interponent from its effective position and means responsive to said movement of the interponent for restoring said control apparatus to said normal condition, so as to open said control circuit.

17. The structure defined by claim 16 wherein said means for moving said interponent from its effective position includes an element mounted for movement by said manually operable control means.

18. The structure defined by claim 4 wherein said means for urging said interponent towards its effective position comprises a second electric motor, and which includes means responsive to the operation of said manually operable control means toward its dispensing position for energizing said second motor and means for withdrawing said interponent from its effective position when said second motor is deenergized.

19. The structure defined by claim 4 which includes means operable after the starting of said electric motor for holding said motor energized long enough to establish said control apparatus in said actuated condition.

20. The structure defined by claim 19 which comprises a holding circuit including said electric motor, a normally open additional switch, and means operable in timed relation with said power shaft for closing said normally open additional switch and for reopening it after said indicators have been resert to zero position.

21. The structure defined by claim 4 which includes a motor driven pump for supplying liquid to said dispenser, means including said normally open contacts for starting said pump, said control apparatus serving to close and open said normally open contacts when said apparatus occupies said actuated and said normal conditions respectively.

22. The structure defined by claim 4 which includes a motor pump for supplying liquid to said dispenser, a second normally open switch for starting the motor pump and a valve for starting and stopping flow through said dispenser, said control apparatus serving to close said normally open contacts and open said valve when said apparatus reaches said actuated condition and to open said normally open contacts and to close said valve when said apparatus moves from its actuated condition.

23. The structure defined by claim 21 which includes means responsive to starting of said resetting motor for establishing a holding circuit for said motor and for maintaining said holding circuit long enough to obtain the operation of said control apparatus to its actuated condition.

24. A liquid dispensing apparatus including dispensing control apparatus, a resettable register and power means for resetting said register and operating said apparatus, (a) said register having a number of numeral bearing indicators having zero indicating positions, a drive shaft and means for advancing said indicators in proportion to the operation of said drive shaft.

(1) means including a rotatable resetting shaft for resetting said indicators to zero indicating position, (b) said control apparatus having a normal condition in which said dispenser is rendered inoperative to dispense liquid and an actuated condition in which said dispenser is rendered operative, actuating means for establishing said control apparatus in said actuated condition, (c) said power means including an electric motor, a power shaft connected for operation by said motor, (1) means connecting said power shaft to operate said resetting shaft, (d) said actuating means for said control apparatus including (1) a first arm mounted for oscillation in a path and means operated by said power shaft for causing oscillation of said arm through said path, (2) a second arm mounted adjacent said control apparatus for movement from an initial position in which it permits said control apparatus to occupy said normal condition, to an effective position in which it holds said apparatus in said actuated condition, (3) an interponent mounted for movement to and from an effective position in the path of said first arm and including means to transmit movement of said first arm toward one end of its path, to said second arm to move said second arm to its effective position, (4) means for urging said interponent toward its effective position, and (5) means for preventing movement of said interponent to its effective position except when said arm is adjacent the other end of its path, (c) manually operable control means mounted for movement between an initial and a dispensing position, (1) a normally open switch, means operable by said control means as it approaches its dispensing position for closing said switch, (2) means responsive to the closure of said switch for energizing said motor to operate said power shaft to reset said register indicators to zero, to move said first arm to said other end of its path to permit movement of said interponent to its effective position and to thereafter move said second arm to its effective position and said control apparatus to said actuated condition, said control apparatus including means for deenergizing said motor when said apparatus attains said actuated condition.

References Cited by the Examiner

UNITED STATES PATENTS

| | | | |
|---|---|---|---|
| 1,692,489 | 11/28 | Dinsmore | 235—139.1 |
| 2,626,082 | 1/53 | Bliss et al. | 222—35 X |
| 2,932,448 | 4/60 | Bliss. | |
| 3,100,062 | 8/63 | Spalding | 222—35 |

LOUIS J. DEMBO, *Primary Examiner.*